(12) United States Patent
Saffer et al.

(10) Patent No.: US 6,718,336 B1
(45) Date of Patent: Apr. 6, 2004

(54) DATA IMPORT SYSTEM FOR DATA ANALYSIS SYSTEM

(75) Inventors: Jeffrey D. Saffer, Richland, WA (US); Augustin J. Calaprist, Richland, WA (US); Guang Chen, Richland, WA (US); Vernon L. Crow, Richland, WA (US); Jonathon D. McCall, Richland, WA (US); Nancy E. Miller, San Diego, CA (US); Philip J. Monroe, Johnstown, OH (US); Lucille T. Nowell, Richland, WA (US); Deborah A. Payne, Richland, WA (US); Randall E. Scarberry, Richland, WA (US); Lisa C. Stillwell, Richland, WA (US); Sarah J. Thurston, Richland, WA (US); Leigh K. Williams, Richland, WA (US); Sean J. Zabriskie, Richland, WA (US)

(73) Assignee: Battelle Memorial Institute, Columbus, OH (US)

( * ) Notice: Subject to any disclaimer, the term of this patent is extended or adjusted under 35 U.S.C. 154(b) by 116 days.

(21) Appl. No.: 09/672,622

(22) Filed: Sep. 29, 2000

(51) Int. Cl.[7] .............................................. G06F 17/30
(52) U.S. Cl. ...................................................... 707/102
(58) Field of Search ................................ 707/3, 4, 100, 707/102

(56) References Cited

U.S. PATENT DOCUMENTS

| | | | |
|---|---|---|---|
| 4,555,617 A | * 11/1985 | Brooks et al. ............... | 235/379 |
| 4,961,139 A | 10/1990 | Hong et al. ................. | 364/200 |
| 5,018,077 A | * 5/1991 | Healey ........................ | 715/509 |
| 5,325,298 A | 6/1994 | Gallant .................. | 364/419.19 |
| 5,361,326 A | 11/1994 | Aparicio, IV et al. ........ | 395/21 |
| 5,497,491 A | * 3/1996 | Mitchell et al. ............. | 709/315 |
| 5,506,937 A | 4/1996 | Ford et al. ..................... | 395/12 |
| 5,528,735 A | 6/1996 | Strasnick et al. ............ | 395/127 |
| 5,555,354 A | 9/1996 | Strasnick et al. ............ | 395/127 |
| 5,586,196 A | * 12/1996 | Sussman ....................... | 348/63 |
| 5,625,767 A | 4/1997 | Bartell et al. ................ | 395/140 |
| 5,659,766 A | 8/1997 | Saund et al. ................. | 395/759 |
| 5,671,381 A | 9/1997 | Strasnick et al. ............ | 395/355 |
| 5,675,788 A | 10/1997 | Husick et al. ............... | 395/615 |
| 5,687,364 A | 11/1997 | Saund et al. ................. | 395/605 |
| 5,692,107 A | 11/1997 | Simoudis et al. ............. | 395/50 |
| 5,696,963 A | 12/1997 | Ahn ............................ | 395/605 |

(List continued on next page.)

Primary Examiner—Safet Metjahic
Assistant Examiner—Haythim J. Alaubaidi
(74) Attorney, Agent, or Firm—Finnegan, Henderson, Farabow, Garrett & Dunner, LLP

(57) ABSTRACT

A data import system enables access to data of multiple types from multiple data sources of different formats and provides an interface for importing data into a data analysis system. The interface enables a user to customize the formatting of the data as the data is being imported into a data analysis system. A user may select first user defined options for operating on a first data set received during a data importation process. An intermediate representation of the data set is generated based on the user first defined options. A user may specify second user defined options based on the intermediate representation during the data importation process. The second user defined options are processed to produce a final data representation of the data set to be used for analysis of the data. The intermediate representation may be a data table. The processing of a data set may include merging a first and second data set to produce the final data representation. The second user defined options may enable a user to select a basic operation for merging the data sets or to select a non-basic operation for merging the data sets. The basic operation may combine data sets in response to a user's selection of a first graphical interface control, and the non-basic operation may combine the data sets based on user selection of at least two graphical interface controls from a group of graphical interface controls.

32 Claims, 25 Drawing Sheets

U.S. PATENT DOCUMENTS

| | | | | |
|---|---|---|---|---|
| 5,708,828 A | * | 1/1998 | Coleman | 707/523 |
| 5,721,903 A | | 2/1998 | Anand et al. | 395/605 |
| 5,721,912 A | | 2/1998 | Stepczyk et al. | 395/613 |
| 5,729,741 A | * | 3/1998 | Liaguno et al. | 707/104.1 |
| 5,732,260 A | | 3/1998 | Nomiyama | 395/605 |
| 5,737,591 A | | 4/1998 | Kaplan et al. | 395/601 |
| 5,767,854 A | | 6/1998 | Anwar | 345/355 |
| 5,784,544 A | | 7/1998 | Stevens | 395/112 |
| 5,787,274 A | | 7/1998 | Agrawal et al. | 395/613 |
| 5,794,178 A | | 8/1998 | Caid et al. | 704/9 |
| 5,838,973 A | | 11/1998 | Carpenter-Smith et al. | 395/701 |
| 5,842,206 A | | 11/1998 | Sotomayor | 707/5 |
| 5,857,179 A | | 1/1999 | Vaithyanathan et al. | 707/2 |
| 5,857,185 A | | 1/1999 | Yamaura | 707/5 |
| 5,861,891 A | | 1/1999 | Becker | 345/433 |
| 5,864,863 A | | 1/1999 | Burrows | 707/103 |
| 5,873,076 A | | 2/1999 | Barr et al. | 707/3 |
| 5,903,893 A | | 5/1999 | Kleewein et al. | 707/10 |
| 5,907,838 A | | 5/1999 | Miyasaka et al. | 707/4 |
| 5,910,897 A | | 6/1999 | Dangelo et al. | 364/488 |
| 5,913,214 A | | 6/1999 | Madnick et al. | 707/10 |
| 5,918,010 A | | 6/1999 | Appleman et al. | 395/200.33 |
| 5,926,806 A | | 7/1999 | Marshall et al. | 707/3 |
| 5,926,820 A | | 7/1999 | Agrawal et al. | 707/200 |
| 5,930,784 A | | 7/1999 | Hendrickson | 707/2 |
| 5,930,803 A | | 7/1999 | Becker et al. | 707/104 |
| 5,945,982 A | | 8/1999 | Higashio et al. | 345/203 |
| 5,953,716 A | | 9/1999 | Madnick et al. | 707/4 |
| 5,963,965 A | | 10/1999 | Vogel | 707/501 |
| 5,966,139 A | | 10/1999 | Anupam et al. | 345/440 |
| 5,982,370 A | | 11/1999 | Kamper | 345/356 |
| 5,986,652 A | | 11/1999 | Medl et al. | 345/339 |
| 5,987,470 A | | 11/1999 | Meyers et al. | 707/102 |
| 5,991,714 A | | 11/1999 | Shaner | 704/9 |
| 5,999,192 A | | 12/1999 | Selfridge et al. | 345/440 |
| 5,999,937 A | | 12/1999 | Ellard | 707/101 |
| 6,012,053 A | | 1/2000 | Pant et al. | 707/3 |
| 6,014,661 A | | 1/2000 | Ahlberg et al. | 707/3 |
| 6,023,694 A | | 2/2000 | Kouchi et al. | 707/2 |
| 6,026,409 A | | 2/2000 | Blumenthal | 707/104 |
| 6,029,176 A | | 2/2000 | Cannon | 707/104 |
| 6,032,157 A | | 2/2000 | Tamano et al. | 707/104 |
| 6,034,697 A | | 3/2000 | Becker | 345/433 |
| 6,038,538 A | | 3/2000 | Agrawal et al. | 705/7 |
| 6,038,561 A | | 3/2000 | Snyder et al. | 707/6 |
| 6,044,366 A | | 3/2000 | Graffe et al. | 707/2 |
| 6,049,806 A | | 4/2000 | Crecine | 707/200 |
| 6,058,391 A | | 5/2000 | Gardner | 707/4 |
| 6,067,542 A | | 5/2000 | Cariño, Jr. | 707/4 |
| 6,073,115 A | | 6/2000 | Marshall | 705/35 |
| 6,073,138 A | | 6/2000 | de l'Etraz et al. | 707/104 |
| 6,078,314 A | | 6/2000 | Ahn | 345/169 |
| 6,078,914 A | | 6/2000 | Redfern | 707/3 |
| 6,078,924 A | | 6/2000 | Ainsbury et al. | 707/101 |
| 6,081,788 A | | 6/2000 | Appleman et al. | 705/14 |
| 6,081,802 A | | 6/2000 | Atherton et al. | 707/3 |
| 6,081,811 A | * | 6/2000 | Nilsson | 707/201 |
| 6,085,190 A | | 7/2000 | Sakata | 707/6 |
| 6,088,032 A | | 7/2000 | Mackinlay | 345/355 |
| 6,092,061 A | | 7/2000 | Choy | 707/1 |
| 6,094,648 A | | 7/2000 | Aalbersberg | 707/3 |
| 6,094,649 A | | 7/2000 | Bowen et al. | 707/3 |
| 6,098,065 A | | 8/2000 | Skillen et al. | 707/3 |
| 6,100,901 A | | 8/2000 | Mohda et al. | 345/440 |
| 6,101,493 A | | 8/2000 | Marshall et al. | 707/3 |
| 6,108,004 A | | 8/2000 | Medl | 345/346 |
| 6,108,651 A | | 8/2000 | Guha | 707/4 |
| 6,108,666 A | | 8/2000 | Floratos et al. | 707/104 |
| 6,111,578 A | | 8/2000 | Tesler | 345/356 |
| 6,112,194 A | | 8/2000 | Bigus | 706/11 |
| 6,112,209 A | | 8/2000 | Gusack | 707/101 |
| 6,121,969 A | | 9/2000 | Jain et al. | 345/355 |
| 6,122,636 A | | 9/2000 | Malloy et al. | 707/102 |
| 6,125,304 A | * | 9/2000 | Suzuki | 700/182 |
| 6,128,624 A | | 10/2000 | Papierniak et al. | 707/104 |
| 6,163,775 A | * | 12/2000 | Wlaschin et al. | 707/1 |
| 6,167,405 A | * | 12/2000 | Rosensteel, Jr. et al. | 707/102 |
| 6,185,555 B1 | | 2/2001 | Sprenger et al. | 707/3 |
| 6,195,662 B1 | * | 2/2001 | Ellis et al. | 707/103 R |
| 6,249,786 B1 | | 6/2001 | Wadewitz | 707/6 |
| 6,356,901 B1 | * | 3/2002 | MacLeod et al. | 707/6 |
| 6,507,842 B1 | * | 1/2003 | Grey et al. | 707/5 |
| 6,560,633 B1 | * | 5/2003 | Roberts et al. | 709/202 |

* cited by examiner

ASSIGN FORMAT 902

| PREVIEW | <NEW SOURCE NAME> |

CHOOSE A FORMAT FOR THE SOURCE FILE:

- DATA TABLE
- SEQUENCE
- STRUCTURED TEXT
- UNSTRUCTURED TEXT

- ○ EXCEL SPREADSHEET — 932
- ○ TAB-DELIMITED TEXT — 934
- ○ COMMA-DELIMITED TEXT — 936
- ○ OTHER DELIMITER: [___] — 937, 938

[OK]  [CANCEL]

ASSIGN FORMAT

| PREVIEW | <NEW SOURCE NAME> |

CHOOSE A FORMAT FOR THE SOURCE FILE:

- DATA TABLE — 930
- SEQUENCE — 940
- STRUCTURED TEXT — 950
- UNSTRUCTURED TEXT — 960

942 — ○ FASTA
944 — ○ SWISSPROT
946 — ○ GENBANK

[ OK ]   [ CANCEL ]

*FIG. 9c*

TRANSLATION TO TABLE                                                1100

SOURCE FILE: FILE1
TRANSLATING DATA: MEDLINE FORMAT
TOTAL RECORDS
RECORDS FOUND WITH MISSING ABSTRACTS
RECORDS FOUND WITH MISSING SOURCE
THESE RECORDS HAVE BEEN WRITTEN TO A FILE NAMED: FILE2.EMPTY

SOURCE FILE: FILE1
TRANSLATING DATA: MEDLINE FORMAT
IDENTIFYING ROWS AND COLUMNS, ETC.

PROCESSING COMPLETE.

PROGRESS  [### RECORDS PROCESSED] 1120

[OK]  [PAUSE]  [CANCEL] 1190

*FIG. 11*

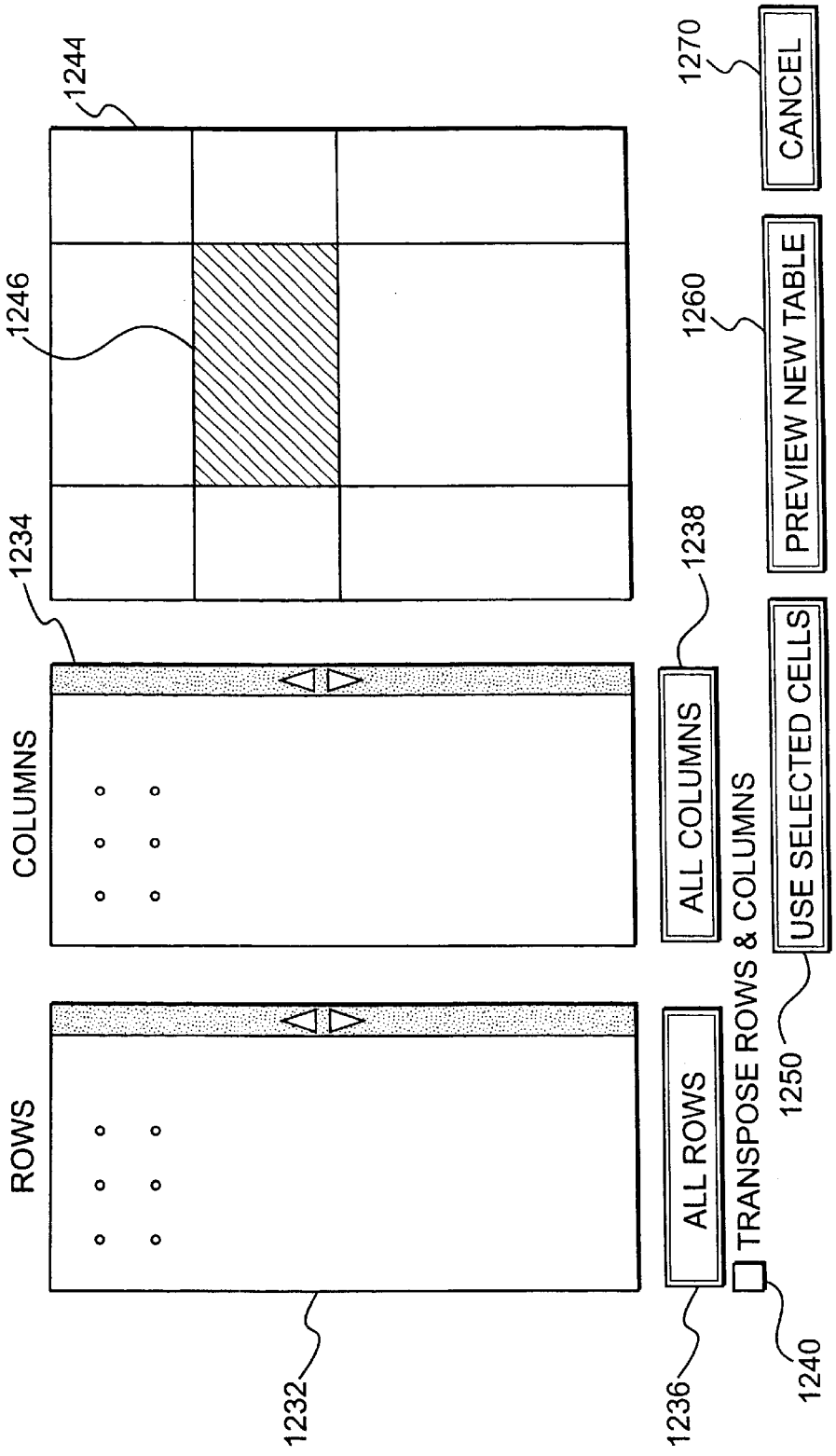

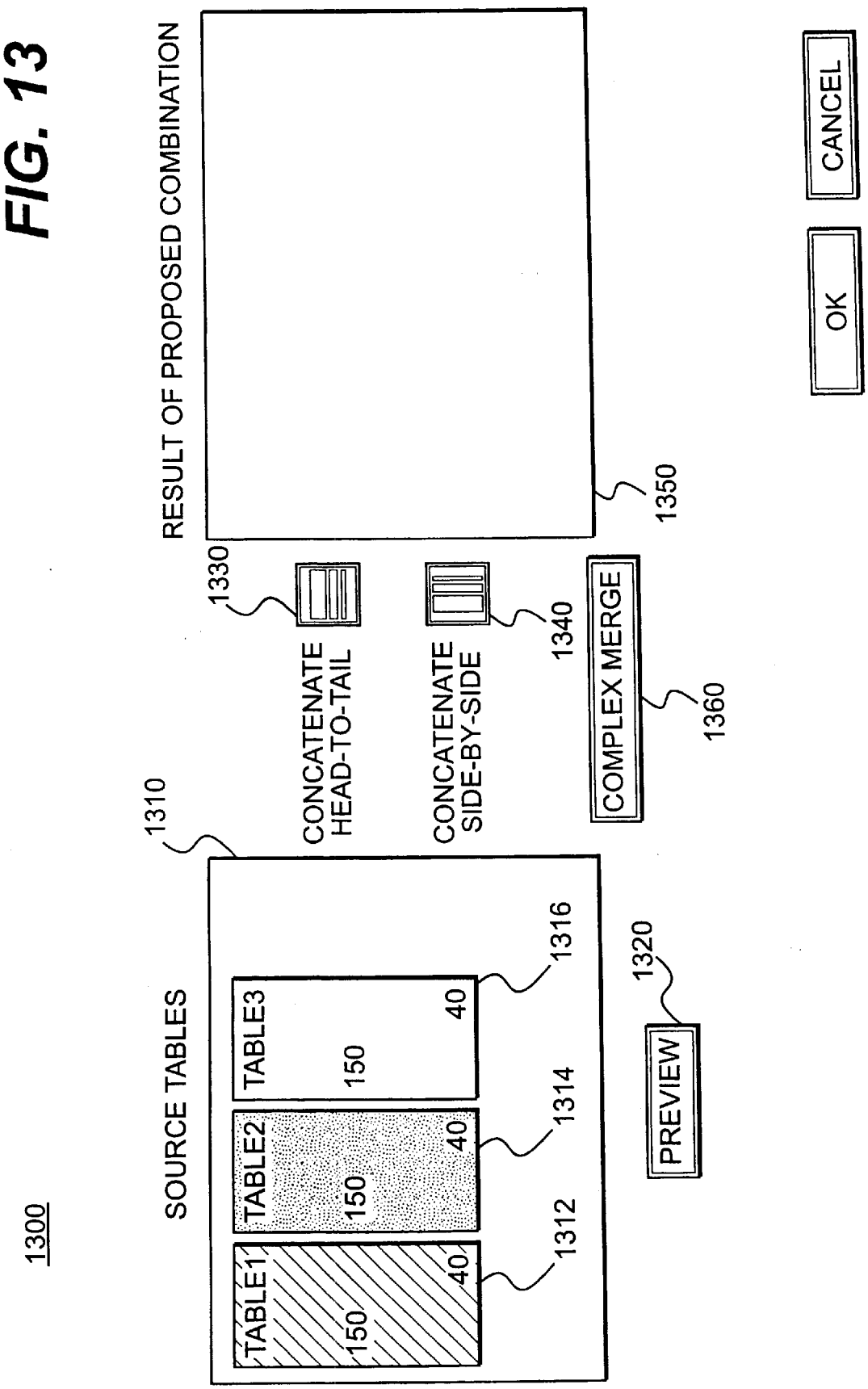

RECORD IDENTIFIER IN COLUMN(S): 1(DEFAULT) | SELECT COLUMN(S)
COLUMN HEADERS IN ROW(S): 1(DEFAULT) | SELECT ROW(S)
PRIMARY TABLE: TABLE A ▽
PRECEDENCE
  NON-NUMERIC DATA: USE VALUE IN PRIMARY TABLE.
  NUMERIC DATA: ● AVERAGE INTERSECTING CELLS (DEFAULT)
                   ○ USE VALUE IN PRIMARY TABLE.

1690 — WHAT IS PRECEDENCE?
PRIMARY TABLE HAS PRIORITY. IGNORE COLUMNS THAT HAVE NO MATCH IN THE PRIMARY TABLE.

| abc | | abcd | | | abc | |
|---|---|---|---|---|---|---|
| 1xxx | | 1yyy | | | 1 xxx | |
| 2 | + | 2yyyy | = | | 2 yyy | |
| 3xxx | | 4 y | | | 3 xxx | |

MERGE OPERATIONS

ROWS
○ PRECEDENCE
○ UNION
● INTERSECTION

COLUMNS
● PRECEDENCE
○ UNION
○ INTERSECTION

RESULT

| abc | | abcd | | | abc |
|---|---|---|---|---|---|
| 1xxx | | 1yyy | | | 1 aaa |
| 2 | + | 3yyyy | = | | 3 xxx |
| 3xxx | | 4 y | | | |

TABLES ALIGNED BY MATCHING RECORD IDENTIFIERS. ANY RECORDS THAT DO NOT OCCUR IN ALL TABLES ARE IGNORED.

COLUMNS MATCH THOSE IN THE PRIMARY TABLE. OTHERS ARE IGNORED. NUMERIC DATA IN INTERSECTING CELLS IS AVERAGED.

SOURCE TABLES
TABLE A
TABLE B
TABLE C
TABLE D

PREVIEW | MERGE | CANCEL

*FIG. 15b*

TABLE IS COMPLETE:

MULTIPLE TABLES HAVE BEEN SUCCESSFULLY MERGED TOGETHER.

|        | COLUMN1 | COLUMN2 | COLUMN3 | COLUMN4 | COLUMN5 | ... |
|--------|---------|---------|---------|---------|---------|-----|
| RECORD1 |        |         |         |         |         |     |
| RECORD2 |        |         |         |         |         |     |
| RECORD3 |        |         |         |         |         |     |
| RECORD4 |        |         |         |         |         |     |
| RECORD5 |        |         |         |         |         |     |
| RECORD6 |        |         |         |         |         |     |
| ...     |        |         |         |         |         |     |

1600

1620

SAVE    RE-DO MERGE    CANCEL

*FIG. 16*

DATA IMPORT SYSTEM FOR DATA ANALYSIS SYSTEM

I. FIELD OF THE INVENTION

This invention relates generally to a system for importing data into a data analysis system and, more particularly, to a system for importing data into a data analysis system for graphically displaying data relationships for the imported data.

II. BACKGROUND OF THE INVENTION

To make informed decisions regarding large volumes of collected records, automated processes are used to analyze and identify relationships that exist among the records. One of the most useful processes for gaining a quick and useful understanding of these relationships is the use of data analysis visualization tools for visualization-based exploratory data analysis. Data analysis visualization tools are software packages that create graphical representations of the relationships that exist among data sets or records.

Visualization-based exploratory data analysis involves three primary steps: importing the data from one or more sources, creating the visualizations from that data, and exploring and mining the data. A common problem for data analysis systems is getting data into a form that can be handled appropriately by the analysis software. The data streams and formats that are encountered are as varied as the creators of that information. Thus, it has been difficult to provide an input process or system to accommodate the variety of data formats.

These difficulties are amplified if analysis is desired for information of many types. For example, free text, numeric, categorical information, and genomic sequence data are different types of data that may be encountered in records. In addition to desiring systems that can handle data of various types, users desire flexibility in transforming data from one format to another. Depending on the nature of the data, the user may desire a variety of mathematical or other operations to be performed on the information, such as normalization schemes. This is particularly important with experimentally derived data.

There are several standard data formats, such as tab-delimited ASCII files, that can be read by spreadsheet and other programs. Automated and semi-automated methods exist for importing data from these standard formats into software analysis packages (e.g., the Text Import Wizard in Microsoft Excel). However, even within these standard formats, the organization of information may not be consistent with the desired, ensuing data analysis.

R. Ford, R. Thompson and D. Thompson, Supporting heterogeneous data import for data visualization, Proceedings of the 1995 ACM Symposium on Applied Computing, pp.81–85, 1995, have described one approach for combining datasets from various sources and formats. They use format converters that can be created for preexisting data formats and apply these to convert digital geographic information into a format that can be used by IBM Data Explorer software. This approach has general utility, but the output types are not sufficiently structured for enabling integrated data visualization and mining across disparate data types and structures.

H. Davulcu, G. Yang, M. Kifer, and I. Ramkrishnan, Computational Aspects of Resilient Data Extraction from Semistructured Sources, Proceedings of the 19<sup>th</sup> ACM SIGMOD-SIGACT-SIGART Symposium on Principles of Database Systems, pp. 136–144, 2000, describe a method for extracting information from semistructured data sources such as HTML pages. The variability in construction of those data sources and the need to extract common attributes from those sources presents difficulties. The approaches rely on extraction expressions as a means for identifying target data within a larger context. U.S. Pat. No. 5,913,214 to Madnick, et al., entitled Data extraction from word wide web pages, also describes a system for extracting disparate, heterogeneous data from multiple semi-structured data sources. In this system, a data translator is added to provide the data context needed for queries and retrieval. In a related patent, U.S. Pat. No. 5,953,716, entitled Querying heterogeneous data sources distributed over a network using context interchange, methods are provided to generally handle problems in data set creation, but these methods do not handle unstructured data sources, do not provide means for integrating multiple data types, and do not permit user-defined manipulations of the data.

Another approach for combining information from different sources is discussed in U.S. Pat. No. 6,023,694 to Kouchi, et al., entitled Data retrieval method and apparatus with multiple source capability. In the '694 patent, information is retrieved from two or more data sources by using drivers specific for each data format and converted to a database with a standardized data structure using key categories for organizing the data. U.S. Pat. No. 5,721,912 to Stepczyk, et al., entitled Graphical user interface for creating database integration specifications, also uses a data translation step in the framework of a graphically represented workflow.

C. Squire, Data Extraction and Transformation for the Data Warehouse, Proceedings of the 1995 ACM SIGMOD International Conference on Management of Data, pp. 446–447, 1995, discusses the integration and transformation of data for a data warehouse. However, Squire does not provide a general process for importing data into visualization and mining systems and does not describe a system that supports integration of different data types.

To enable analytical and visualization methods to be applied to multiple data types the final data format is standardized. D. King, Using Dimensions to Represent Data Base Attributes, Conference Proceedings on APL and the Future, pp. 151–155, 1985; and G. Bringham and E. Shaw, An N-Dimensional Data Structure in Support of Electronic Data Interchange (EDI) Translation, Proceedings of the International Conference on APL '91, pp. 71–79, 1991, describe a standard database data structure in which each data object can be thought of as a collection of attributes. As such, each object may be represented by an N-dimensional collection of elements. The discussed N-dimensional collection is a valuable construct for data visualization, but does not have the flexibility to incorporate data from multiple sources, the ability to manipulate the data, and the ability to represent some data types (e.g., genomic sequence or text).

U.S. Pat. No. 5,361,326 to Aparicio et al., entitled Enhanced interface for a neural network engine, describes one approach for bringing together some aspects of the data import requirements. A generalized data translator is provided along with an ability to manipulate or transform the raw data as part of the front end to a neural network analysis.

After importing data for analysis, a number of manipulations may be made. These include operations or transformations with the data or merging overlapping information. In order to process these steps correctly, the data type for those operations should be defined. The data type can be defined by the user at the time of the process or an automatic method can be used for identifying data type. One method for identifying data type is described in U.S. Pat. No. 5,991,714 to Shaner, entitled Method of identifying data type and locating in a file. The '714 patent uses an n-gram-based approach to characterize an electronic file of unknown data type. The n-grams are weighted and compared to defined thresholds for known data types. Automatic data type determination is also described in U.S. Pat. No. 6,014,661 to Ahlberg, et al., entitled System and method for automatic analysis of data bases and for user-controlled dynamic querying. The data is subjected to a series of tests that assess consistency with defined data types. For example, if the data contains only alphabetic ASCII characters, the data is assumed to be text or if the values detected are limited to 0 and 1, the data is assumed to be binary.

Data type recognition has also been applied to data streams as discussed in U.S. Pat. No. 5,784,544 to Stevens, entitled Method and system for determining the data type of a stream of data. The '544 patent approach sequentially assumes each of the valid data types, translates the data from one type to another, and uses a count of valid characters as the basis for data type determination. This method applies to character type directly as opposed to the category of data (numerical, text, categorical, etc.). However, these data type identification techniques do not facilitate importation of data sets of various types and formats for use in a form readily usable by a visualization based data analysis system.

Thus, a system or method is needed that enables the importation of data of various types into a data visualization and analysis system and that provides flexibility in producing a final data set for analysis from differently formatted data sets.

III. SUMMARY OF THE INVENTION

Generally described, methods and systems consistent with the present invention import data into a data analysis system by enabling access to data from multiple data sources, where the data of the data sources are often structured in different data formats, and by providing an interface for importing data into the data analysis system. The interface enables a user to customize the formatting of the data as the data is being processed for importation into the data analysis system.

More particularly, a method or system of importing data into a data analysis system, consistent with the present invention, enables a user to specify first user defined options for operating on a first data set received during a data importation process. An intermediate representation of the data set is generated during the data importation process based on the user first defined options. A user may specify second user defined options based on the intermediate representation during the data importation process. The second user defined options are processed to produce a final data representation of the data set to be used for analysis of the data. This may be extended to more than two data sets, combining them in any order or simultaneously.

The intermediate representation may be a data table. The second user defined options may enable a user to select particular rows and columns of the data set for inclusion in the final data representation. The processing of a data set may include merging a first and second data set to produce the final data representation. The second user defined options may enable a user to select a basic operation for combining the data sets or to select a non-basic operation for combining the data sets. The basic operation may combine data sets in response to a user's selection of a first graphical interface control, and the non-basic operation may combine the data sets based on user selection of at least two graphical interface controls from a group of graphical interface controls.

Another aspect consistent with the present invention provides a method of processing data sets for use in a data analysis system. The format of a data set to be imported into the system is determined and each data location of the data set that has a value missing is assigned a missing value indicator. The indicator may be the same indicator for each missing value of each data set processed by the system or missing value indicators may be uniquely chosen for each data set based on user selection.

IV. BRIEF DESCRIPTION OF THE DRAWINGS

FIGS. 9a–9e are diagrams of data type format selection screens consistent with the present invention.

FIG. 11 is diagram of data set translation screen consistent with the present invention.

FIGS. 12a and 12b are diagrams of screens for selecting attributes to be used in a final data set representation consistent with the present invention.

FIG. 13 is a diagram of the general merge data table screen consistent with the present invention.

FIGS. 15a and 15b are diagrams of screens associated with non-basic merge operations consistent with the present invention.

FIG. 16 is a diagram of data set viewer consistent with the present invention.

V. DETAILED DESCRIPTION

Reference will now be made in detail to an embodiment of the present invention as illustrated in the accompanying drawings.

A. Overview

Systems and methods operating consistent with the present invention enable a user to introduce or import, via a data importation system, data of various types and contained within various structures or formats into a data analysis system. Such methods and systems allow variability in the format of input data, enable manipulations of individual data sets, enable data from multiple sources to be combined in a variety of ways, enable merged data sets to be manipulated, and establish a uniform data structure for data visualization and analysis, all during the data importation process.

An embodiment consistent with the present invention enables component modules to be invoked at various stages of data importation to help ensure a unified and consistent final output for use by the data analysis system. An interactive import interface, consistent with the present invention, enables a user to specify parameters and user desired options during data importation to customize data analysis and to aid in presenting a uniform data set for use by the visualization and data analysis system. The user's input is used to generate an intermediate representation of disparate data types and formats, where the intermediate representation is a common form for all the data types. The parameters needed for data import may also be automatically defined by the system, based on file extensions or from information gathered by parsing all or a portion of the input data. The user may further modify the intermediate representation and merge it with other intermediate representations to create a final representation for N, use in the data analysis system. The user is provided with a choice to merge representations using basic merge operations or more complex merge operations. The more complex merge operations may be performed by selecting a subset of predetermined merge operations from a group. The intermediate representation and the final representation may be a data table representation.

B. Architecture

Figure 1:
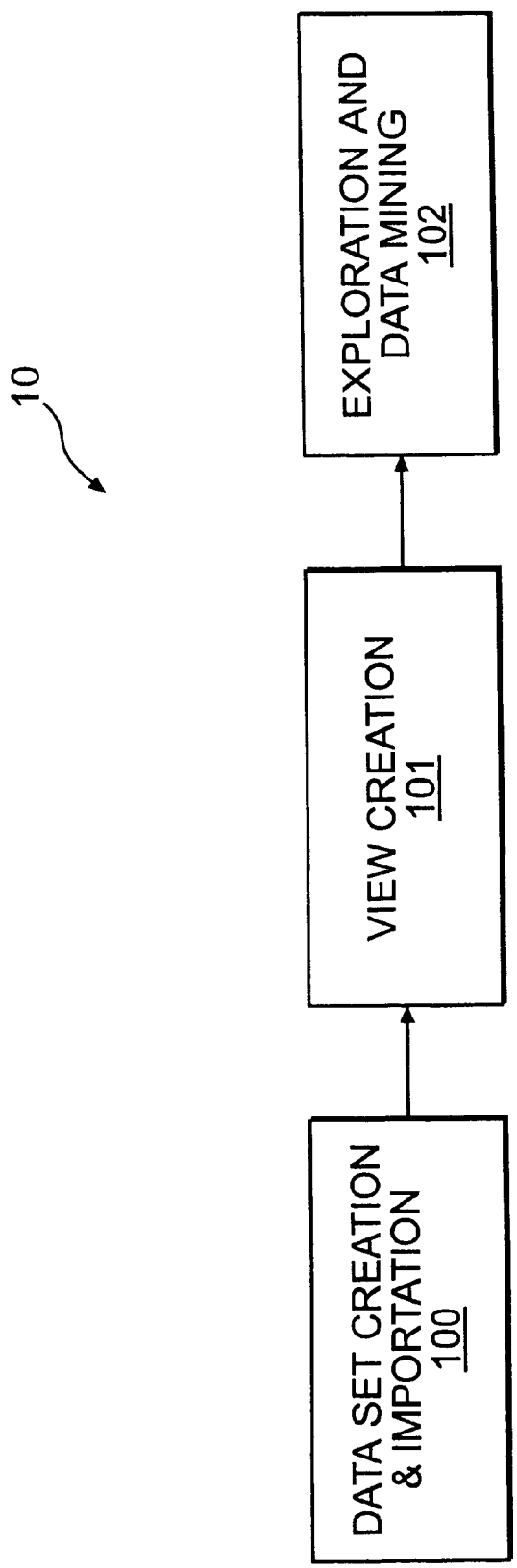
FIG. 1 is a block diagram of the components of a data visualization and analysis system.

Referring to FIG. 1, a block diagram is shown of a data visualization and data mining system 10. The data visualization and data mining system includes a data set importation and creation system 100, a view creation system 101, and a data exploration and mining tool 102. The data set importation and creation system 100 imports data sets of various types and enables the creation of a data set customized to a user's desires and useful for generating visualizations. The view creation system 101 enables the set-up of data visualizations from imported data and the creation of underlying structures used by the data exploration and mining system 102. The data exploration and mining system 102 presents visualizations of user-defined views of the data, and enables interactions through one or more tool sets. Typically, the data visualization and data mining system 10 is embodied in a computer system and accesses electronic information from within its data stores or from other systems to which it is connected. The systems 100, 101, and 102 typically include computer program modules accessible from the memory of a computer system.

Figure 2:
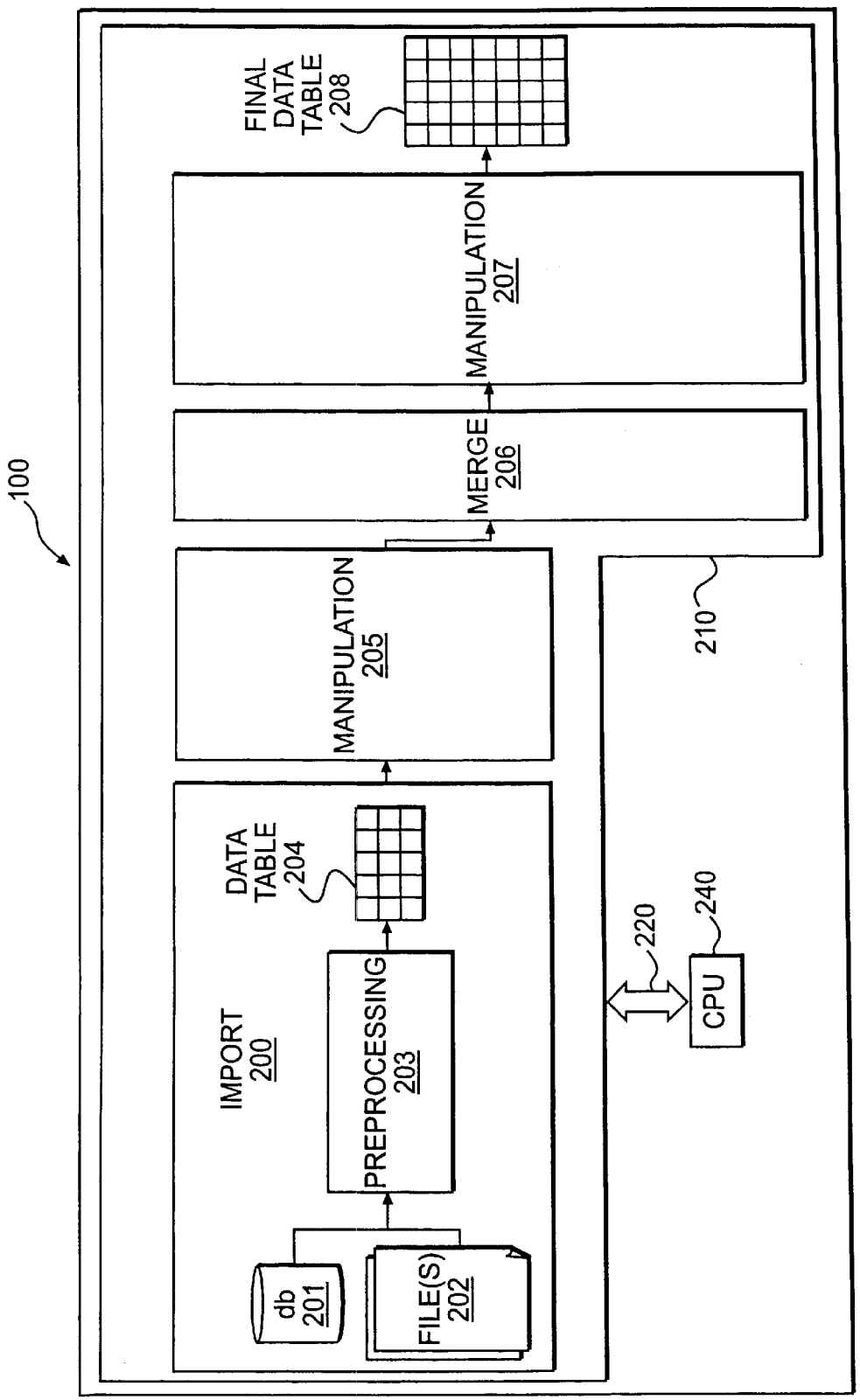
FIG. 2 is a block diagram of a data set creation and importation system consistent with the present invention.

A system consistent with the present invention provides an improved data importation system for a data analysis system, such as the importation system 100. Referring to FIG. 2, a more detailed view of the data importation system 100, consistent with the present invention, is shown. The data importation system 100 is embodied in a computer system. Computer programs used to implement methods consistent with the present invention are generally located in a memory unit 210, and the processes of the present invention are carried out through the use of a central processing unit (CPU) 240 in conjunction with application programs or modules. Those skilled in the art will appreciate that memory unit 210 is representative of read-only, random access memory, a hard drive, and other memory and storage elements used in a computer system. For simplicity, many components of a computer system have not been illustrated, such as address buffers and other standard control circuits. These elements are well known in the art.

Memory unit 210 contains databases, tables, and files that are used in carrying out the processes associated with the present invention. CPU 240, in combination with computer software and an operating system, controls the operations of the computer system. Memory unit 210, CPU 240, and other components of the computer system communicate via a bus 220. Data or signals resulting from the processes of the present invention are output from the computer system via an input/output (I/O) interface, which may be coupled to a display monitor for user viewing and interaction. The I/O interface may be coupled to a user input and/or selection deice for receiving user input, such as a keyboard or mouse.

The data importation system 100 includes several subsystems: a data import subsystem 200, a manipulation subsystem 205, a merge subsystem 206, and a manipulation subsystem 207. The data importation subsystem 100 can be invoked as many times as necessary for initial import of electronic data from the various data sources. The data importation subsystem 200 initially imports data into the data analysis system. After data is initially imported into the system and represented in standardized form, the manipulation module 205 may be invoked to apply transforms or filters to the data, such as to normalize data values by dividing all values by a user defined constant. Merge subsystem 206 enables different data sets or tables to be merged, such as data sets derived from different data sources and types. After the data sets are merged, the manipulation subsystem 207 may be invoked to further refine or modify the merged data set, such as eliminating a data object of the merged set that the user does care to have analyzed by the system.

The data import subsystem 100 is shown to include a database 201 and electronic files 202, each of which may reside on the same or another computer, although one skilled in the art will recognize that data may come from other sources as well, such as direct connection with a measurement device. The information in these data sources may occur in a variety of formats. For example, some data may be in table format, others may be a relational database format, some data may be files that have records and attributes separated by a special delimiter. The data importation subsystem 200 includes a preprocessing subsystem 203 that translates the differently formatted data from the different sources, database 201 and files 202, into a common format or representation. The preprocessing subsystem may include multiple preprocessing modules where each preprocessing module handles data of a different format or type. The common format may be a data table, such as data table 204. Data table 204 represents an N-dimensional array, where N is the number of attributes that define each data record of the data table. As used herein, a record (or object) generally refers to an individual element of a data set. The characteristics associated with records are generally referred to herein as attributes.

The data table 204 is a data model that can be used to represent any data type and to help the user conceptualize the data from the different sources in a similar or common format. By enabling the user to visualize data sets in a common format that was originally in disparate formats, the user can determine what adjustments, if any, are needed to enable consistent data set production to ensure an accurate and reliable data analysis and visualization. In this data model, each record is a row in the data table and each column contains data describing a distinct attribute of the record. This collection of attributes, or any subset of attributes, can be used directly in multivariate analyses. These attributes define for each record a high-dimensional vector representation that can be used for mathematical analysis (e.g., cluster analysis) as well as a common structure for visualization and interaction. Although the presentation of data table 204 in FIG. 2 is two-dimensional, one skilled in the art will recognize that the resulting vector space model can be multi-dimensional.

Multiple data types can be used as attributes in this data model. By using attributes/columns of a data table to represent characteristics of the multiple data types flexibility in data use and analysis is provided. Numeric data (e.g., screening assay results), categorical data (e.g., functional classification or structure descriptors), genomic sequence (protein or nucleic acid), or even free text can be used. Some of this data can be used directly in high-dimensional vector representations. Other types of data may require the definition of specific descriptors or features, leading to the generation of a new collection of attributes. For example, a column of the data table may be translated to a new set of one or more columns. As a result, each data record can ultimately be considered as a vector, whose dimensions are the attribute columns chosen for comparison.

Figure 3:
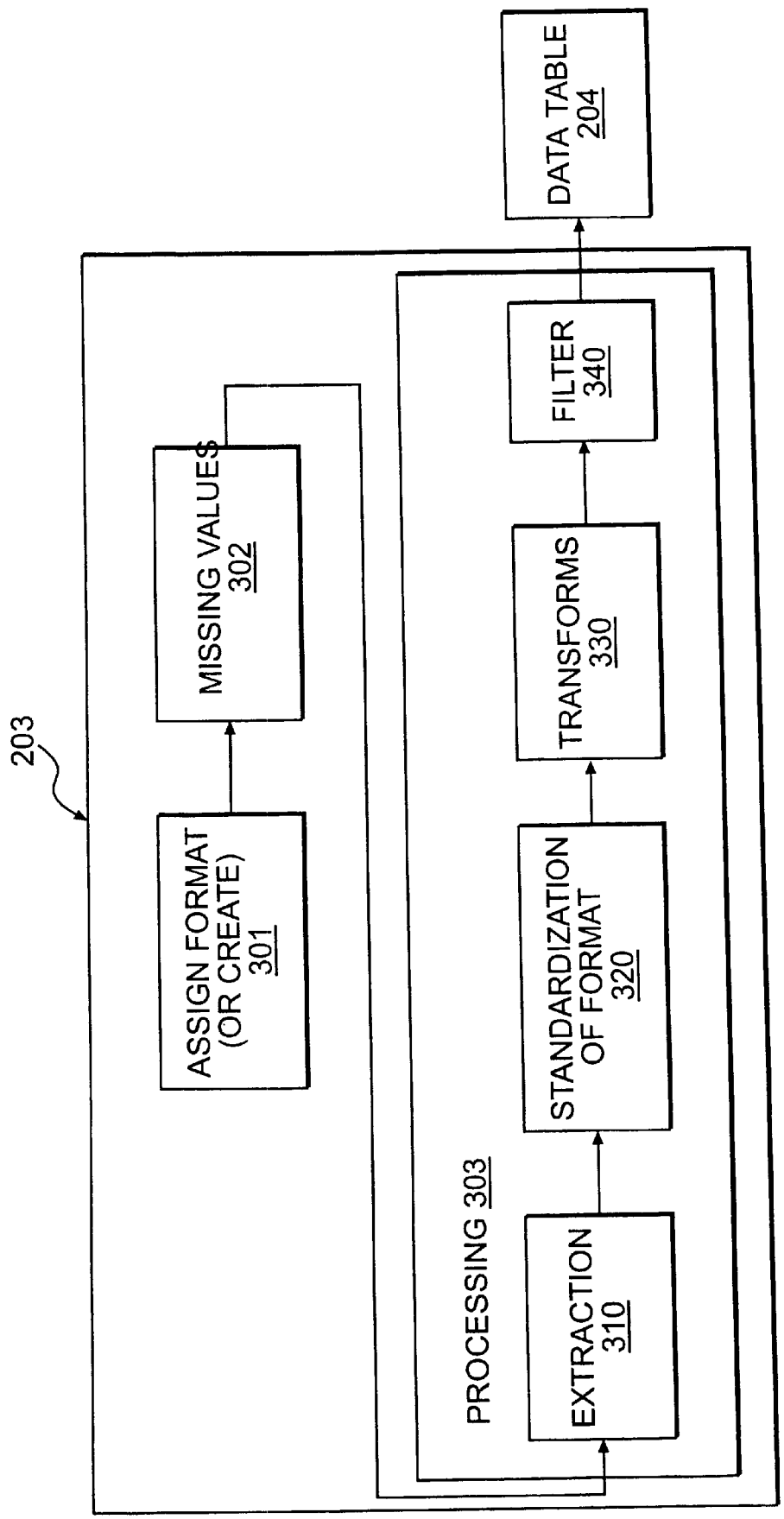
FIG. 3 is a block diagram of a preprocessing subsystem of FIG. 1 consistent with the present invention.

Referring to FIG. 3, the preprocessing subsystem 203 includes several subsystems for processing data. The processing subsystem 203 includes a format assignment subsystem 301, a missing value specification subsystem 302, and a processing subsystem 303. The processing subsystem 303 includes an extraction subsystem 401, format standardization subsystem 402, a transform subsystem 403, and a filter subsystem 404. Initially, the format assignment subsystem 302 assigns a known class of data types to the data source format or structure received from data sources 201 or 202. This assignment can be done automatically by parsing through the contents of the source and comparing the data structure of the contents to known formats. Alternatively, the user can manually select or enter the appropriate format for the data. If the data does not conform to a predefined format, the user can use an interface to indicate the structure of the data.

After the format of the data is assigned, the missing value subsystem 302 prepares the system to handle missing values appropriately. When the missing value subsystem 302 is invoked, the user is asked to define what symbol is to be used to indicate missing data in the data source. A default, such as an empty data cell or any non-numeric data in a numeric data field, can be set or the user can specify one or more strings to be used to indicate a missing value (e.g., NA).

The information gained from the format assignment subsystem 301 and missing data subsystem 302 are then passed to a processing subsystem 303 that translates the data source to the specified data model, which in this case is a data table. It should be appreciated by those skilled in the art that a separate preprocessing module 303 may be used for each data format to be processed. The processing subsystem 303 can be considered a modular component, in that it can be customized for a new data structure or data type. By providing an interactive interface that invokes any one of the subsystems 310, 320, 330, or 340 as requested by a user, the user can tailor importation operations to handle the specific data type being imported. The extraction subsystem 310 is used to extract the relevant data. In the case of some data types (e.g., a data table or a semi-structured file), this may be direct extraction of data from the source. In some cases, for example image or audio data, this step would encompass feature extraction. The extraction subsystem 310 uses the information regarding the format of the data to determine which extraction method to use. With the known format, the extraction subsystem 310 locates and extracts data based on cells if the format is a data table, the location of delimited indicators if the format is a specified file, etc. Methods for extracting relevant data from various type files containing data, such as numeric, text, categorical, gene sequence data are known to those skilled in the art. As described herein, the result from the extraction subsystem 310 is the representation of data objects as a collection of attributes, such as in the form of a data table. After the data is extracted, the data is placed in a table format with the appropriate data objects identified and associated with the corresponding attributes. However, other data models, known to those skilled in the art, are also possible (e.g., delimited text files or relational databases).

Next, the format standardization subsystem 320 performs an automatic recognition of data type. Depending on the data type, relevant statistics may be calculated for the data (e.g., mean and standard deviation for numeric data, number and most frequent categorical values, average sequence length for genome information, and any other desired measure). Determination of numeric data is accomplished by determining if all values other than the missing value indicator(s) can be represented as numbers. If not, if the entries are single strings containing only valid letters for amino acids or nucleotides and the strings are above a user-definable length, then the data type is assumed to be genomic sequence. If not, if the attribute collection is single words or short phrases (user-definable) and less than a user-definable number of distinct values, then the data is assumed to be categorical. Otherwise, the data is assumed to be text.

As noted above, it may be desired for some of the data (e.g., dates) to be in a standard format. The format standardization subsystem 320 formats information, such as dates. The format standardization subsystem 320 can be used to resolve differences in separator and decimal representation as is common between European and American formats, or other such differences. The format standardization subsystem 320 may also standardize the case of textual information.

The transformation subsystem 330 may be selectively used to carry out transforms or other operations on the data. For example, the transformation subsystem 330 may be used to transpose the resulting data table. The transformation subsystem 330 may be used for data source-specific normalization of numeric data prior to combining data from different sources. The transformation subsystem 330 may also be used for other mathematical manipulations such as calculation of averages or determining ratios using values contained within or external to the data source. Text manipulations may include word substitution (for synonyms or standardizing vocabulary). Genomic masking of low complexity regions or repeated sequences is an example of a genomic sequence transformation and combining related categories is an example of categorical data transformation. In addition to the specific examples given, one skilled in the art will recognize that other useful of operations may be performed by the transformation subsystem 330. Note that with the data table model, the attributes associated with each data record can be calculated, as opposed to relying solely on data represented in the original data source. For example, a new attribute such as a mean or standard deviation may be calculated from an existing attribute. Similarly, a text string may be transformed to a series of attributes, one for each vocabulary word, with a calculated value assigned to the data cell. Hence, the result of the transformation subsystem 330 may be a data table that has more columns than initially extracted in subsystem 310.

In some cases, rather than use all of the information extracted or calculated up to this point in the processing, the user may desire to limit the data records or sets of attributes according to some criteria. Therefore, the filter subsystem 340 is provided that optionally can filter data objects (rows) or attributes (columns). This filtering may be based on user specified criteria relevant to particular data cells (e.g., a numerical value less than a defined range, a date before a specified time, or the absence of a specified categorical value) or the characteristics of the overall record or attribute set (e.g., any value above a specified range or no more than 50% of the values missing). Any type of filtering may be applied at this step. The end result of the processing subsystem 303 is a data table 204 for each data source. The processing steps may be applied to each data source.

The steps described for the preprocess subsystem 203 are preferably designed for automation and may be primarily defined by the structure of a particular data source or its relationship to an overall work flow process. However, further user-defined manipulation of the resulting data may be desired or needed. Thus, the manipulation subsystem 205 (FIG. 2) is a graphical user interactive subsystem and is provided for further transformation or filtering of the data. The transformation or filtering of data at this stage may be the types discussed above or any type known to those skilled in the art.

If data from more than one data source is processed, a user interactive merge system 206 (FIG. 2) can be invoked for combining the data into a composite collection of data records. The merge system 206 may perform basic or standardized merge operations and also may perform custom merge operations using predefined operations designed to handle complex merges. An embodiment of the merge subsystem is represented in FIG. 4.

Figure 4:
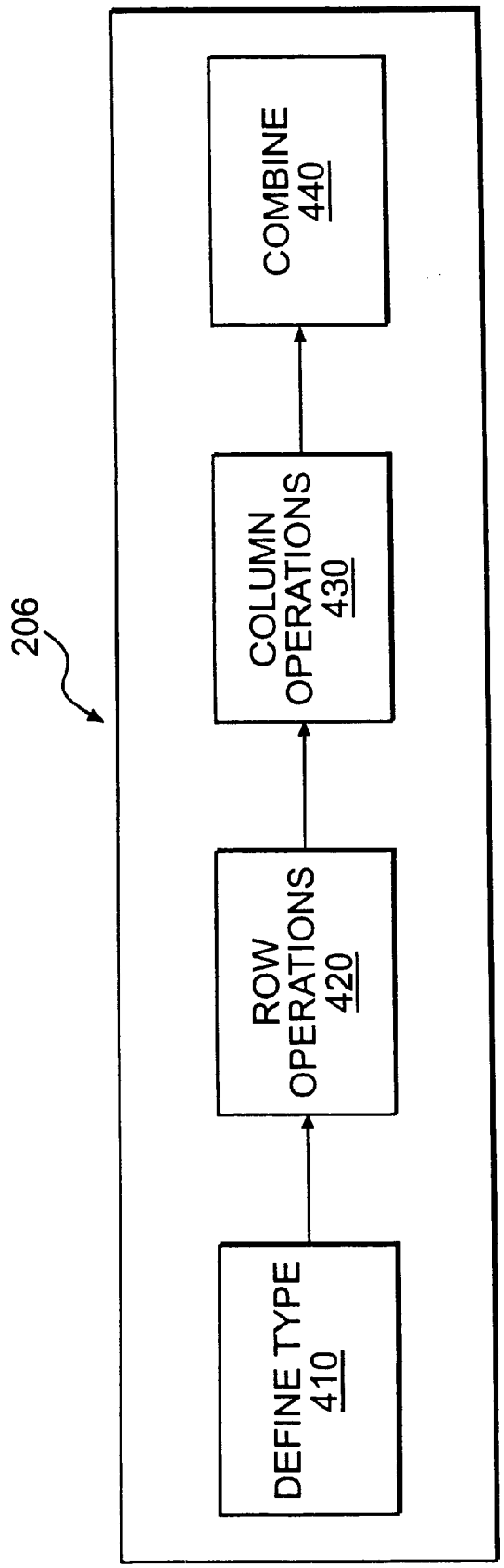
FIG. 4 is a block diagram merge subsystem consistent with the present invention.

Referring to FIG. 4, in the merge system 206, the user first defines how the multiple data sources should be combined 410. The merge system 206 may be programmed to automatically merge data sets with the results being presented to the user for acceptance or rejection. For some data tables, simple concatenation may be desired, such as vertical concatenation (i.e., more records with the same attributes) or horizontal concatenation (more attributes for the same records). In each of these cases, the row and column operation subsystems 420 and 430 handle unequal data table sizes. The table resulting from one source is identified by the user as having precedence before the merge operation takes place. For true merge operations, such as when there is overlapping data, the user may, consistent with the present invention, specify the rules for the merge (e.g., union, intersection, or precedence-based), as discussed below. The subsystem 440 is invoked to resolve data overlap when tables are merged. When there is a data overlap, mathematical operations, such as averaging, may be used to produce a final value from the overlapping value. Alternatively, the subsystem 440 may choose values from the data table designated as having precedence.

Once the individual data sources are combined using the merge subsystem, the user may desire to perform further transformations or filtering on the data (e.g., normalizations or filtering based on values from the overall merged data set). The end result is a final data table 208, which is then passed to the view creation system 101 (FIG. 1).

Although FIG. 2 is discussed in connection with a single pass through the merge and manipulation subsystems 206 and 207, one skilled in the art will recognize that these can be iterative steps, with some data sources being combined, manipulated and filtered, prior to merging with other data sources.

C. Processes

Figure 5:
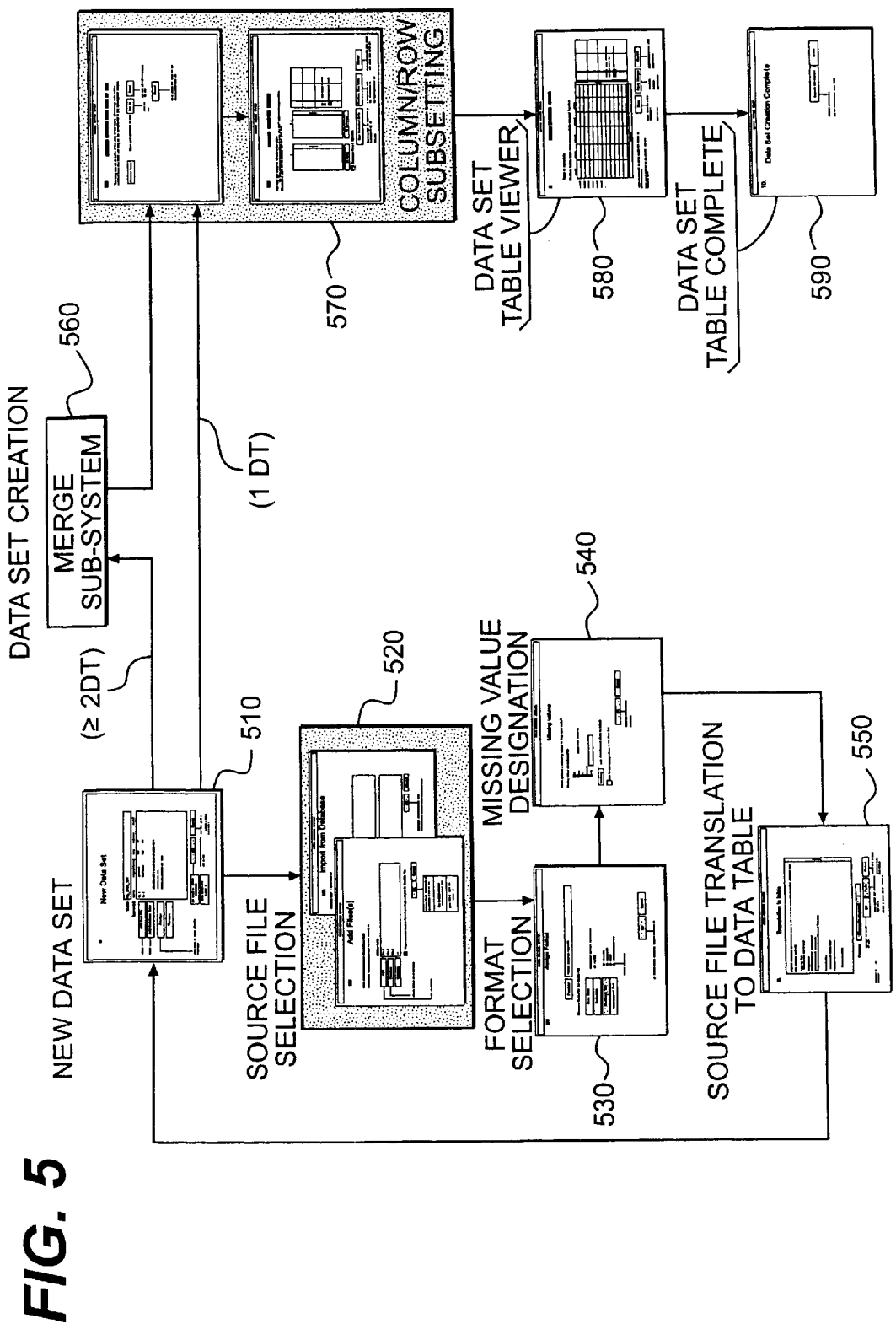
FIG. 5 is a diagram showing the general flow of processes and interactive screens consistent with the present invention.

Referring to FIG. 5, a block diagram showing the interactive flow of the processes and screens presented to a user during data importation is illustrated. The interactive screens illustrated herein correspond to and are a result of processes performed by the subsystems/modules that perform the functions associated with the screen. It should be appreciated that these associated program modules perform the functions discussed herein in association with the screens. These program modules operate in connection with a computer processor, memory system, and computer display system. The interactive screens illustrated are: a new data set creation screen 510, a source file selection screen 520, a format selection screen 530, a missing value designation screen 540, a source file translation screen 550, a merge subsystem screen 560, a column/row subsetting screen 570, a table viewer screen 580, and a data set complete screen 590. The merge subsystem screen 560 is presented if more than one data table (DT) is created. Otherwise, the merge subsystem screen 560 is not presented.

Figure 6:
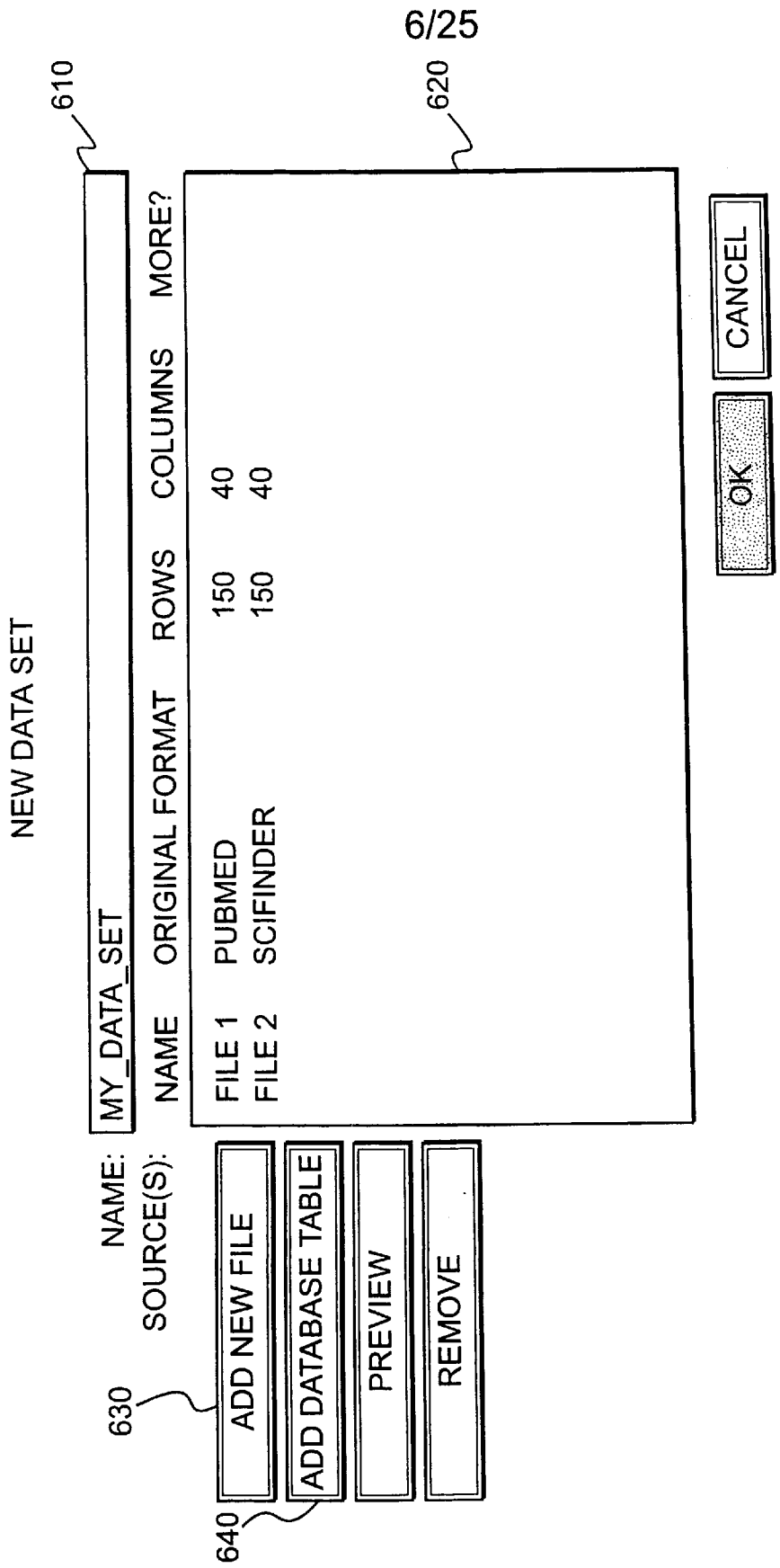
FIG. 6 is a diagram of a new data set screen consistent with the present invention.

The new data set screen 510 enables a user to identify files or database tables to be imported and to name/label the data set that will be created as a result of the importation. Referring to FIG. 6, a detailed view of the new data set creation screen 510 is illustrated. A user may name the new data set to be created in the name field 610. The data set file viewer window 620 illustrates files selected by the user for inclusion in the data set being created. The data set file viewer window 620 identifies the file name, the original format of the file, the number of rows in the file, and the number of columns, or additional information identifying the format or make-up of the data set may be displayed. If the user desires to add another source of data to the users data set, the user selects either the add new file button 630 or the add new database table button 640. If the user selects the add new file button 630, a file chooser dialogue box is displayed and the user may navigate using the dialog box to locate the file to be added to the data set.

Figure 7:
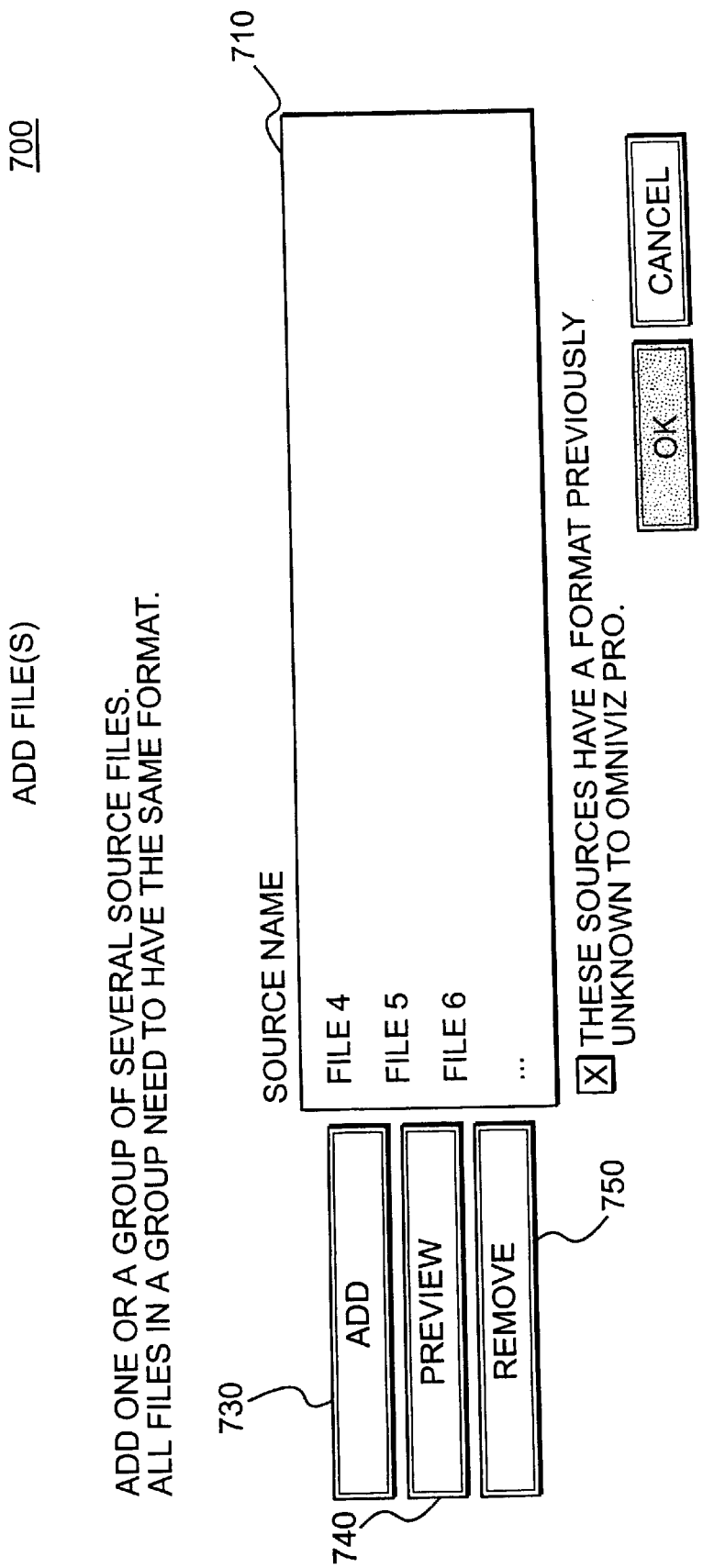
FIG. 7 is a diagram of a file selection screen consistent with the present invention.

When the user selects the add new file button 630, a screen 700 (FIG. 7) is displayed with the user's previously chosen files for the data set presented in a window 710. The user may add more files to the group by selecting the add button 730. The user may preview the information in the file by selecting the preview button 740. The preview button 740 invokes a plain text viewer. After a file has been added, the system attempts to identify the format of the file and, if the format cannot be identified, the system asks the user to assign a file format. If the user selects more than one file, the files will be concatenated and written into a single data set table and the user will be asked to assign a table name to the concatenated data set. From the screen 700, the user may remove a file from the group of files presented in window 710 by selecting the file and activating the remove button 750.

Figure 8:
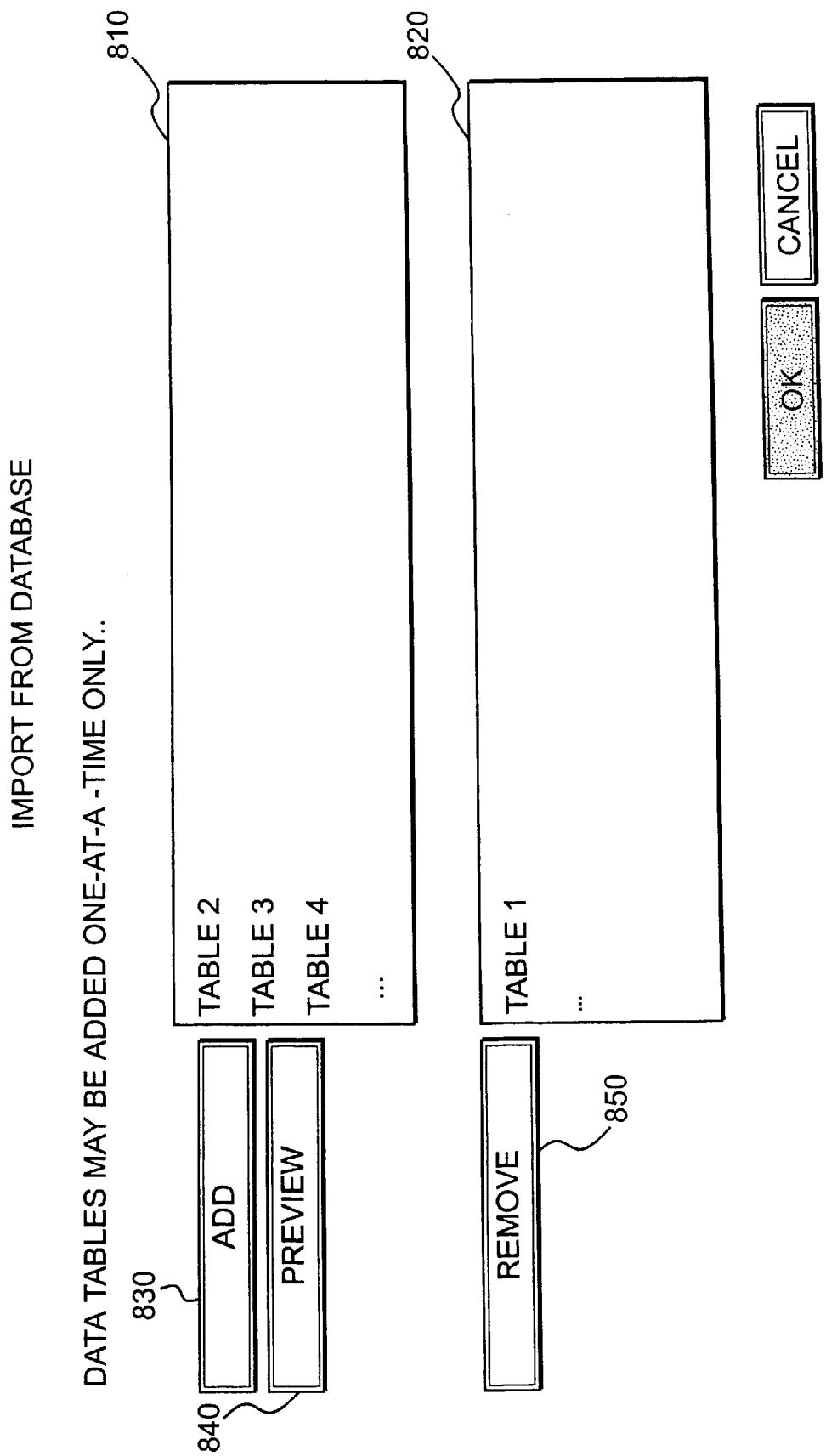
FIG. 8 is a diagram of import data table screen consistent with the present invention.

Referring again to the new data set screen (FIG. 6), if the user opts to add a table from a database, the user selects the add database table button 640. When the user selects the add database table button 640, the system logs in to a specified database from which the user may add tables to the data set being created for importation, as illustrated in FIG. 8. The user may add tables from the database by selecting the add button 830, preview a table by selecting the preview button 840, or may remove a table by selecting the remove button 850. The window 810 displays tables selected by the user for inclusion in the data set being created. The window 820 displays tables selected by the user to be removed from the data set that the user has begun creating. When the user is finished, the user selects the "OK" button and the system translates the tables from the database to the preferred intermediate format, in this case a tab-delimited table.

Figure 9A:
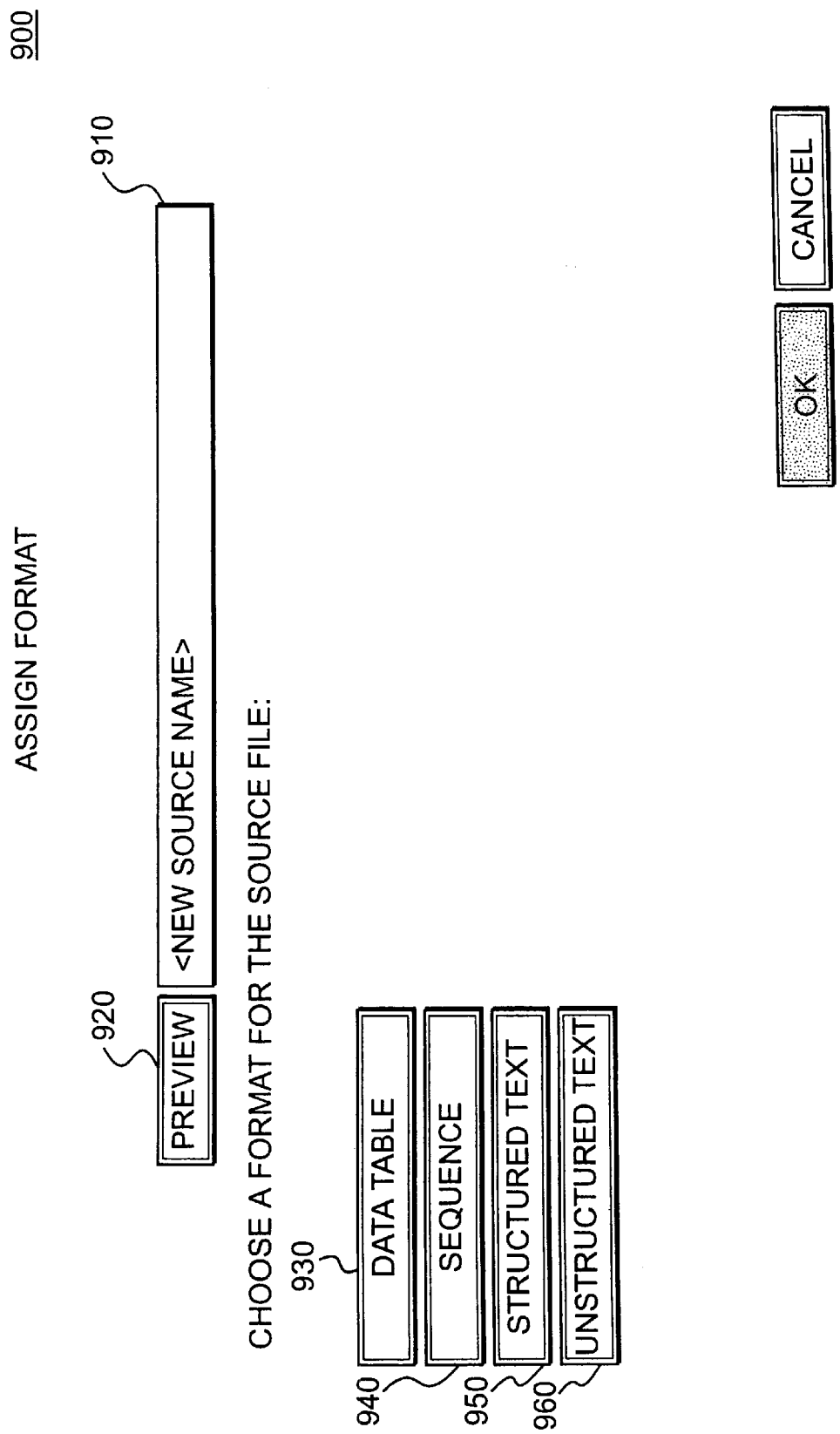

When the user has selected either a file or table to be added to the data set, an assign format screen 900 is displayed (FIG. 9a). The name of the data set/source is displayed in a window 910. The user may preview the contents of the data set by selecting the preview button 920. The user is given the option of selecting one of several general formats for the source data; in FIG. 9a, data table, sequence, structured text, and unstructured text are shown, but additional formats, such as image files, could be included.

Figure 9D:
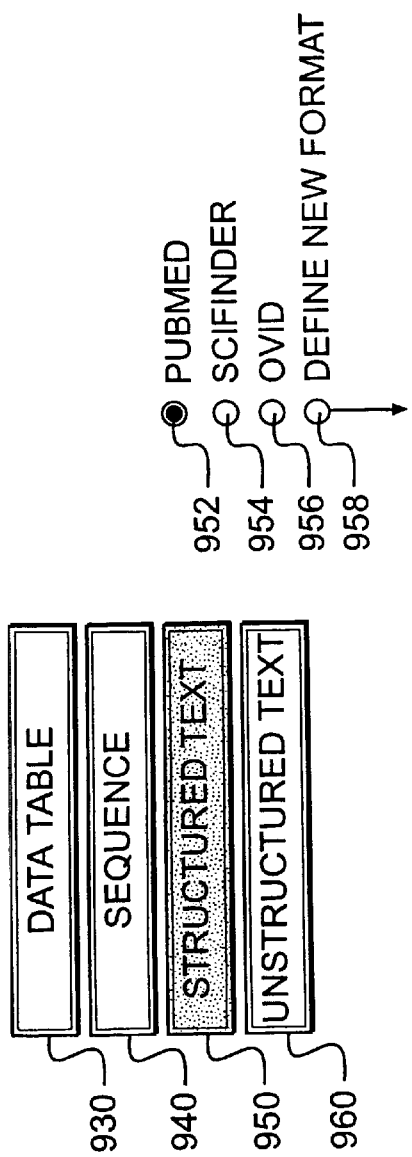
Figure 9E:
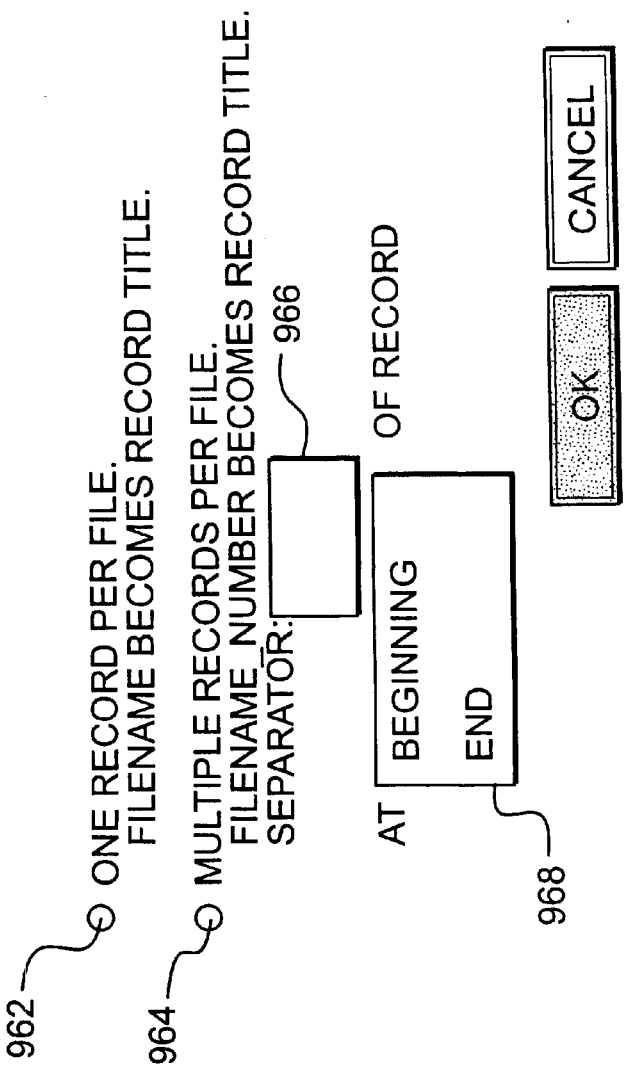

When the user selects the data table button 930, four additional options for identifying the format of the data table are presented (FIG. 9b). The options illustrated are spreadsheet option 932, tab-delimited text 934, comma-delimited text 936, or the user may select the other delimiter option 937 and input the delimiter in an input box 938. If the user selects the sequence format 940, a sequence screen 904 is displayed (FIG. 9c). The user may select the FASTA option 942, the SwissProt option 944, or the GenBank option 946. These options enable the user to specify the particular format of the sequence data of the source file. When the user selects the structured text option 950 (FIG. 9d), four options for specifying the type of structured text is provided. The options presented are the PubMed option 952, the SciFinder option 954, the Ovid option 956, and the define the format option 958. Other defined data formats could also be included. If the user selects the define format option 958, a format editor is presented for the user to define the format of the structured text. If the user selects the unstructured text option (FIG. 9e), the user is presented with options for identifying the unstructured text. Option 962 enables the user to identify whether it is one record per file, in which case the file name becomes the record title, or the user may select option it 964 to indicate that multiple records are contained in each file, in which case the file name number becomes the record title. The user may specify a separator for the records in the input box 966, and may further specify whether to begin at the beginning or end of the record by selecting the appropriate option in box 968.

Figure 10:
FIG. 10 is a diagram of a missing value screen assignment screen consistent with the present invention.

After the user specifies the format for the files, the user may select the OK button to proceed to the missing values screen (FIG. 10). When the user selects the OK button, a missing values screen 1000 is displayed. The user is requested to define how a missing value of the table is to be indicated. There are several options from which to choose. The user may select option 1010, 1020, 1030, 1040, or 1050, which respectively designate a missing value by: N\A, none,—, (empty cell), or other. If the user opts to select the other option 1050, the user must specify the text to be input or associated with the missing value of the table. If the user selects the default button, the missing value option that is assigned to the default button will be used. The user may further specify with option 1070 whether to use the indicated missing value for all missing values of the data set. After the missing values have been indicated, the user selects the OK button to proceed to a translation screen 1100, as illustrated in FIG. 11.

Figure 12A:

The translation screen 1100 (FIG. 11) represents the translation process. The translation process translates the information from the indicated data set to the intermediate representation of the system, which, in this case, is an intermediate data table 204 (FIG. 2). During the translation process, the user may opt to pause the translation by selecting the pause option 1120, or may cancel the translation to the data table by selecting the cancel option 1190. After the translation process has completed, the user may select OK, in which case the new data set screen 510 (FIG. 5) will be presented. At this point, the user may create another data table by specifying a new data set or may elect to modify the rows and columns of the data table. If the user elects to modify the rows and columns of the data table, screen 1200 is displayed (FIG. 12a).

When screen 1200 is presented, the user may opt to preview the table by selecting the preview table button 1220 or select which cells of the table are to be used in a subsequent analysis. Also, the user may opt to use all the rows and columns of the table, in which case screen 600 of FIG. 6 is displayed. The user may also opt to cancel the data table, in which case the table will be deleted and not added to the rest of the tables displayed in screen 600 of FIG. 6. Alternatively, the user may use all or some of the cells in the table. Unselected cells will be deleted from the table and will not be considered in the subsequent analysis by the analysis system. By selecting the select option 1230, the user may select the rows and columns displayed in the windows 1232 or 1234, as illustrated in FIG. 12b. FIG. 12b has a row window 1232 and a column window 1234 in which the column and row headings are specified. The user may select individual rows or columns using a selection device, such as a cursor, for use in the table, or the user may select all rows by using the selection option 1236 or all columns by using the selection option 1238. The user may also transpose the rows and columns by selecting the option 1240. The user may elect to select all rows and columns by selecting option 1250. After the user has selected the rows and columns that are to be used for data analysis, the user selects the preview new table option 1260. The window 1244 shows which cells have been selected by highlighting the appropriate cells 1246 of a general map of the table. The user may also opt to cancel and throw away the entire table by selecting the cancel option 1270 and the table will not be added to the list of FIG. 6.

Referring again to FIG. 5, if the user created multiple data sets from the source files, the multiple data sets may be merged by a merge-subsystem 560. When the merge-subsystem is invoked, the merge interactive screen 1300 illustrated in FIG. 13 is displayed. The merge screen presents several options to a user for merging tables which include a side-to-side concatenation of the data files, head-to-tail concatenation of the data files, and a complex merge which gives the user more flexibility to do creative merging to define unions and intersections between tables for use. If a simple merge is not possible, the complex merge routine is invoked.

A source window 1310 displays a graphical representation of each table that has been created. In this example, the user created tables 1312, 1314, and 1316. If the user elects, the user may preview any of the tables by selecting button 1330. The user has the option of performing lower complexity merges, such as a head-to-tail merge, which may be selected by choosing the head-to-tail option 1330 or the user may select the side-by-side merge by selecting the side-by-side merge option 1340. The results of the proposed merge are displayed in a post-results window 1350. If the user desires to make more complex merges, the user may select the complex merge option 1360.

Figure 14A:
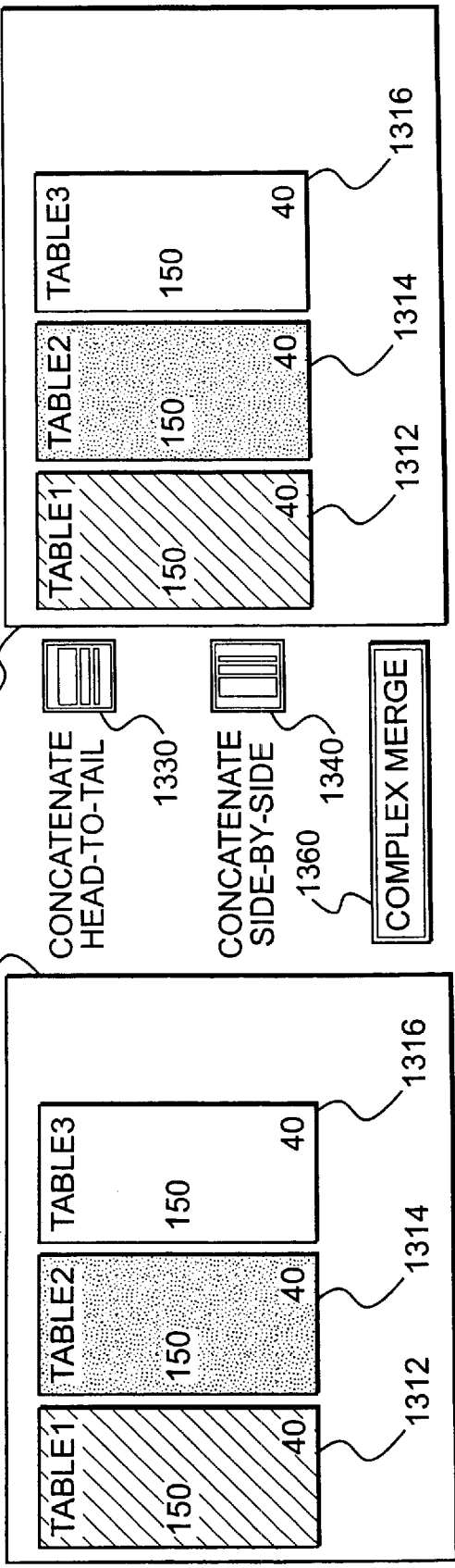
FIGS. 14a–14d are diagrams of merge screens presented when merge options are selected.
Figure 14B:
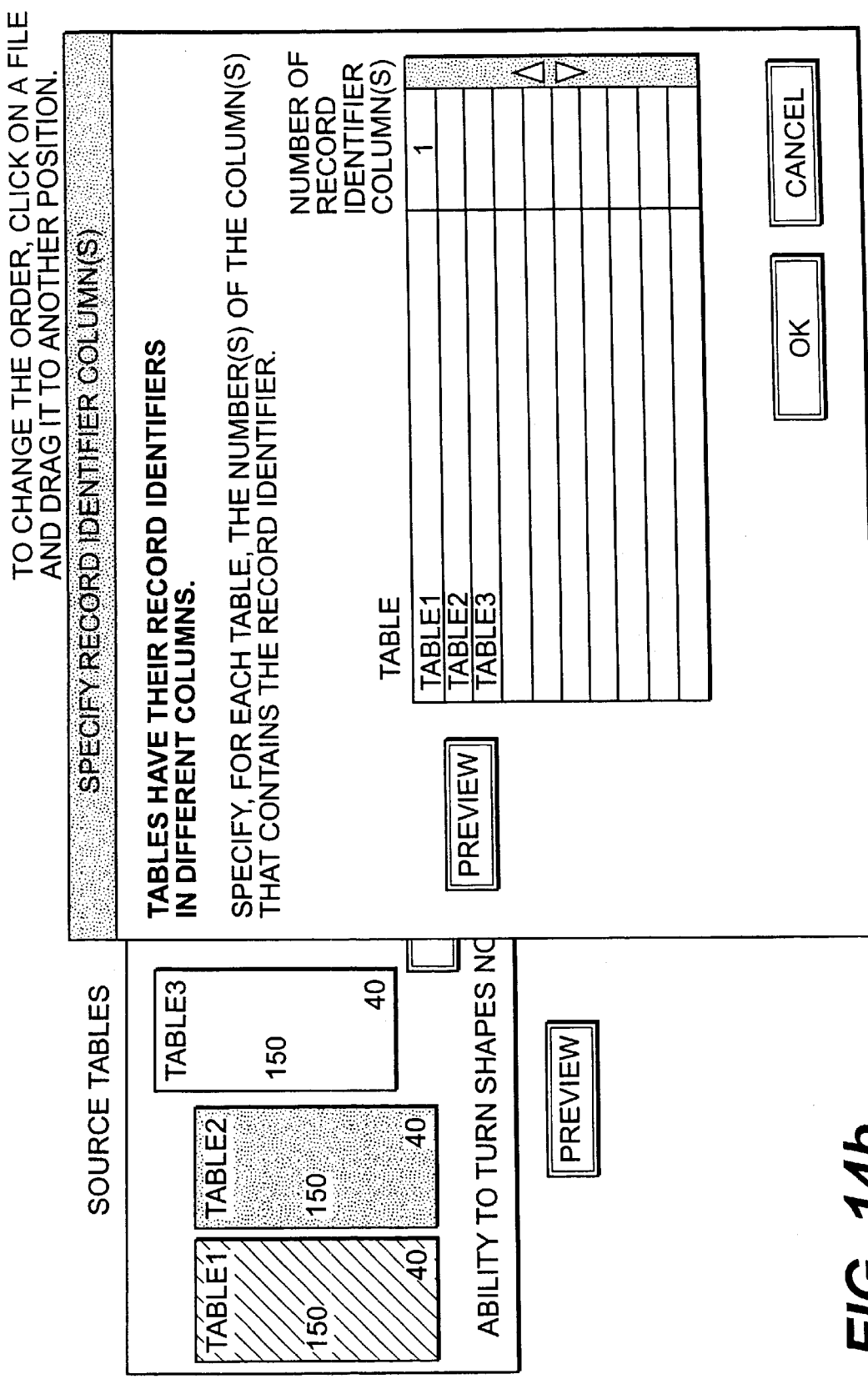

Referring to FIG. 14a, the results of selecting the side-by-side option 1340 is illustrated. When the user selects the side-by-side option 1340, the source tables 1312, 1314, and 1316, are placed side-by-side, and the results are displayed in the proposed merge window 1350. All tables have their record identifiers in column number(s). The user may select an option to record identifiers found in the first table, in which case, the contents of the record identifier columns found in the other tables are disregarded. Also, the user may select an option to include every record identifier in the column. The user may change the order of a file by simply clicking and dragging an indicated table to another position and the proposed combination will be modified according to the positions of the tables after the click and drag operation. After the user has combined the multiple source files using the side-by-side concatenation, the dialogue block, as illustrated in FIG. 14b is displayed. The dialogue block enables the user to specify the record identifier column(s) in the field provided. The user may specify for each table, the number or numbers of the column or columns that contain the record identifier.

Figure 14C:
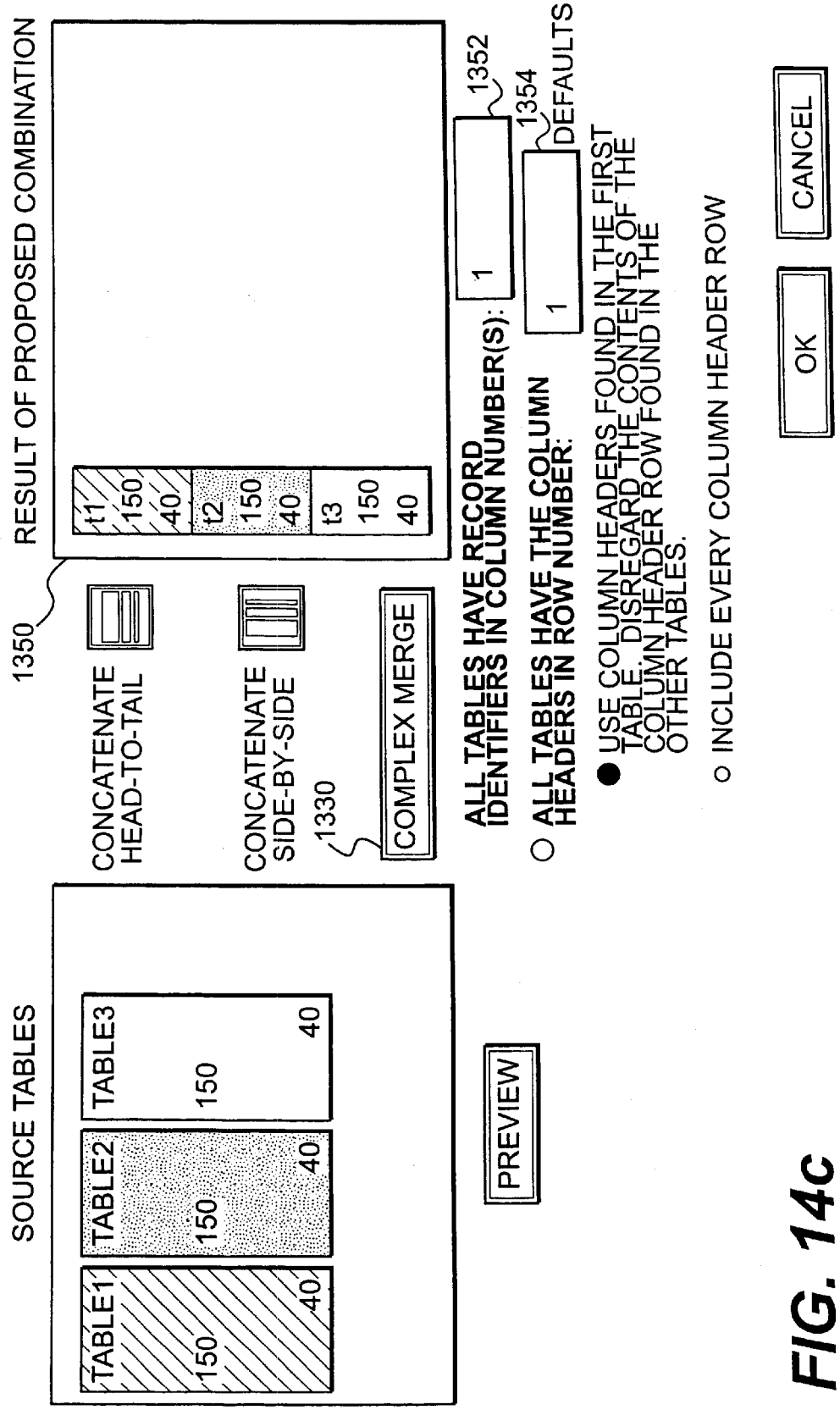
Figure 14D:
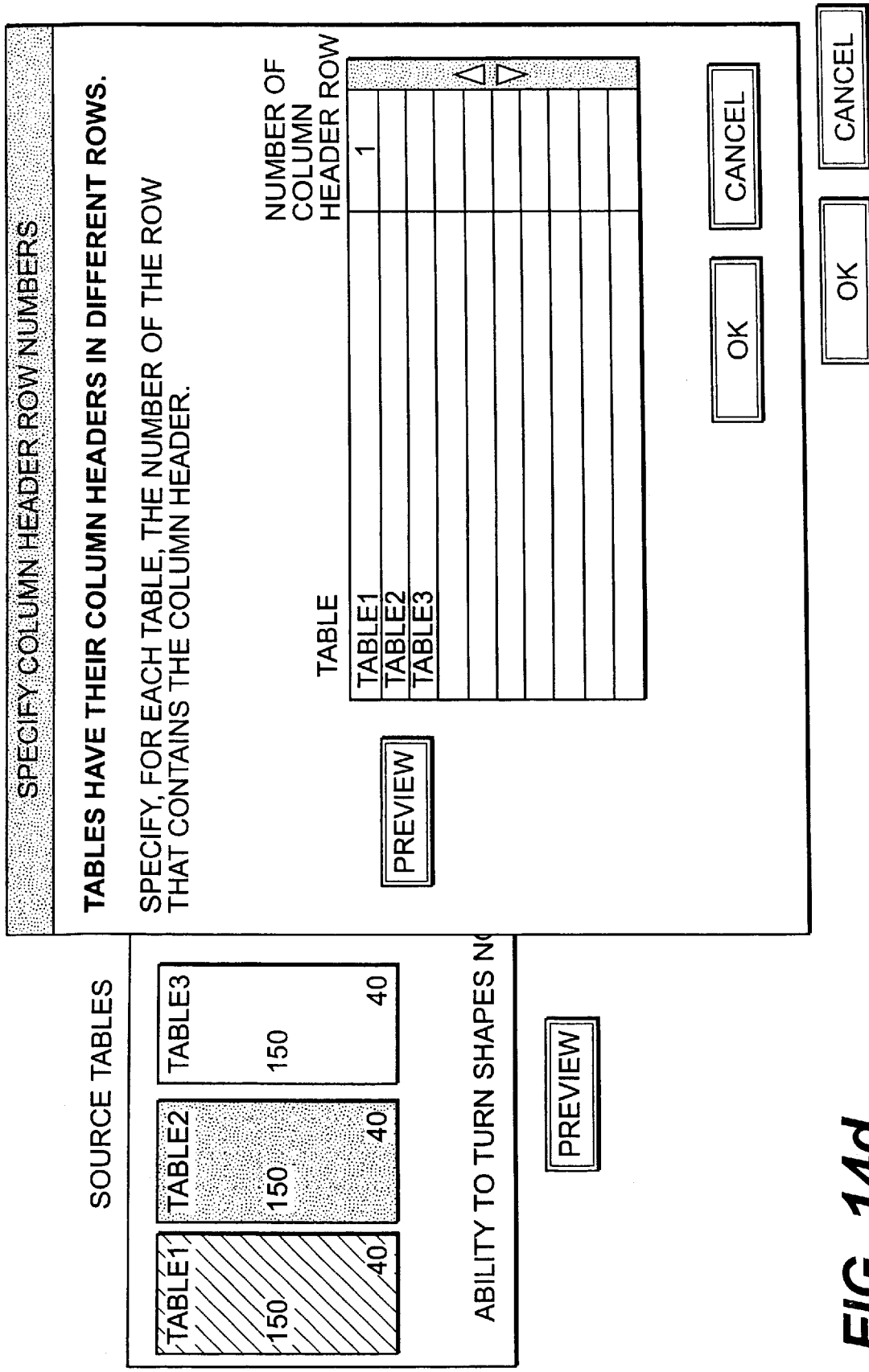

Referring to FIG. 14c, the results of selecting the head-to-tail option 1330 is illustrated. In the proposed results window 1350, the data tables are illustrated in a concatenated combination with the tables organized head-to-tail. The user may change the ordering of the proposed combination by clicking and dragging the file to the desired position. The tables will be in the order according to the positions indicated by the click and drag operation. The user may identify where record identifiers and column headers are located using input boxes 1352 and 1354, respectively. The user may also specify an option to use column headers found in the first table, in which case, the contents of the column headers found in the other tables will be disregarded. If the option to include every column header row (that is, headers from each table) is selected and the user has not indicated that all tables have the column header in the same row (1354), a dialogue box may be displayed to enable the user to specify column header row numbers, as illustrated in FIG. 14d. The user may accept the proposed combination by selecting the OK button, in which the process will proceed to table viewer 580 of FIG. 5.

Figure 15A:
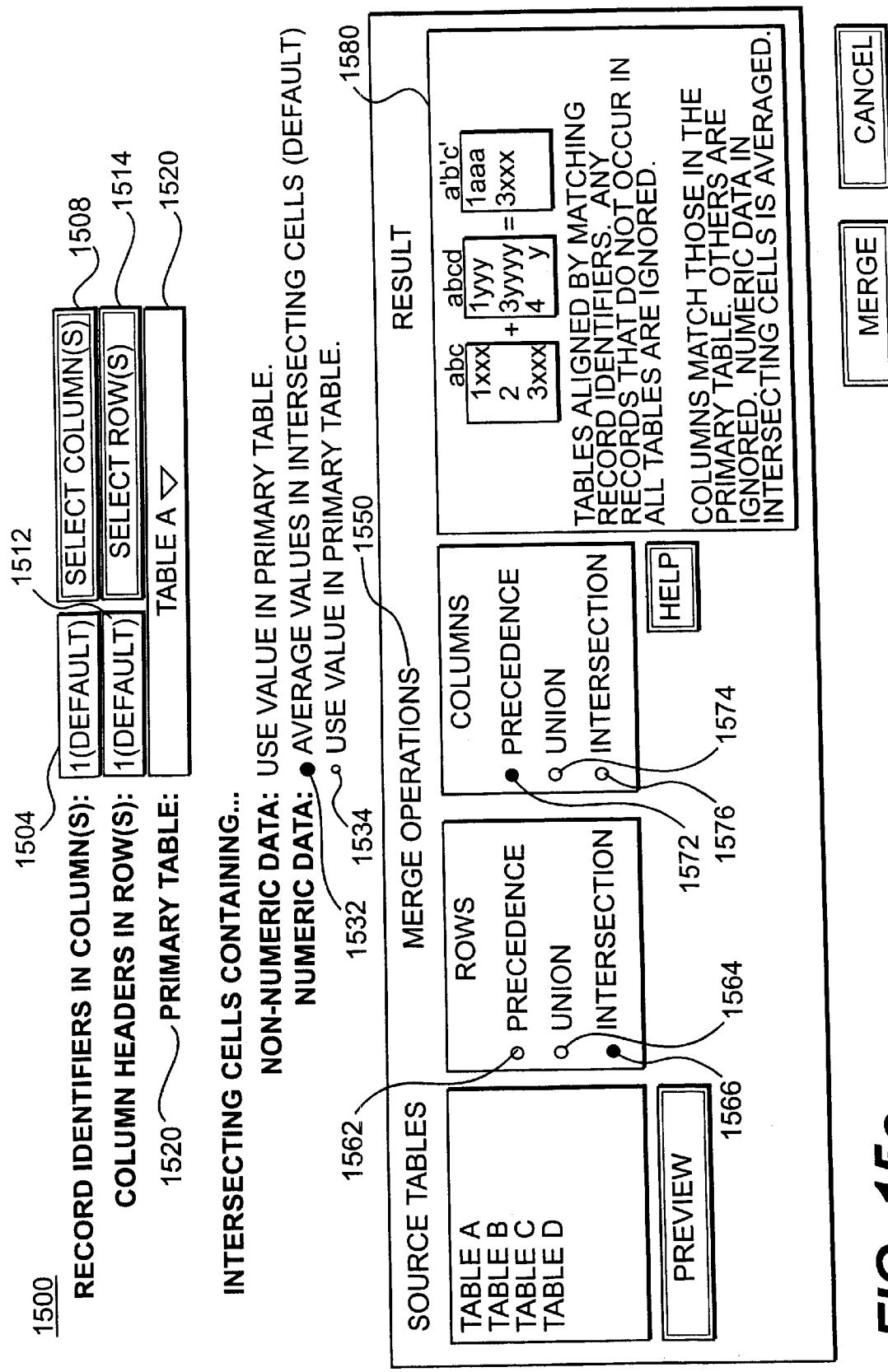

If the complex merge option is selected, the screen 1500 (FIG. 15a) displays several input choices and options for merging the data. The user may specify the record identifier for the table in the box 1504 and may specify the column headers in the row or rows in box 1512. The default record identifier or column header is column 1 or row 1, if the user does not input a numeric value. The user may confirm the selected column or selected rows by selecting the option 1508 or 1514, respectively. Because multiple tables are being merged, one table is established as a primary table, for a reference, from which other operations are based. The primary table may be selected by using a pull down menu 1520 to identify the primary table of the multiple tables to be merged. When non-numeric data is being used, the values of the primary table are used. When numeric data is in the table, the user may select option 1532 or 1534 to define the manner of creating values in intersecting cells. Selection of option 1532 will cause the values of intersecting cells to be averaged. Selection of option 1534 will cause the values of the cells of the primary table to be used in intersecting cells.

The merge operations 1550 available to a user include three options for rows and three options for columns. Three options are available for merging rows and are precedence 1562, union 1564, or intersection 1566. The user may select one of these three options for merging the rows. Similarly, for columns, three options are available and are precedence 1572, union 1574, and intersection 1576. The user may select one of these three options for use in merging columns. When these options are invoked, program modules corresponding to the specified merge operation merge the rows and columns according to its associated merge function. The results window 1580 is presented after the user makes the selection for the appropriate merge operations to be used for both rows and columns and presents the results in the results window, as illustrated. For example, the intersection option 1566 is chosen for rows in this example, and the precedence option 1572 is chosen for columns. The results of merging table ABC with table ABCD equals table A'B'C', as illustrated. Tables are aligned by matching record identifiers. Any records that do not occur in all tables are ignored. Columns match those in the primary table and all others are ignored. Numeric data in the intersecting cells is averaged. The user may select the merge option to effect the merge operation displayed in the result window.

Referring to FIG. 15b, a help window 1690 is illustrated. The help window 1590 is presented when a user allows a cursor to hover over one of the rows/columns merge operations for a preselected time period. For example, when the user allows the cursor to hover over the precedence option 1562, the help window 1590 is displayed. The help window 1590 shows the result of invocation of a precedence merge operation if the precedence option 1562 is chosen. The results of the merger of the ABC table with the ABCD table is illustrated by the resulting table A'B'C' after the equal sign. When precedence is chosen, the primary table has priority. All columns that have no match in the primary table are ignored.

Referring to FIG. 16, the resulting table from merge operations may be viewed in the data set table viewer screen 1600. All columns of the merged data table may be viewed by using a scroll bar on the table or by using the table viewer window 1620 to select, by highlighting, a group of cells of the viewer 1620 that corresponds to the particular column and record combination of the merged table.

As described above in detail, methods and apparatus consistent with the invention allow data from multiple sources, in multiple formats, containing multiple data types, to be synthesized into a single conceptual data table for analysis. The resulting conceptual data table may have additional calculated attributes and can be refined through manipulation and filtering at multiple steps. Through the use of a modular structure for preprocessing raw data sources and for merge operations, flexibility in handling various sources is provided. The methods described herein can be accomplished with varying degrees of user intervention. At one extreme, the user could specify parameters for each step. At the other extreme, the workflow process may be standardized sufficiently so that most, if not all, the entire process is automated. In between, the use of wizards or other step-wise guidance protocols may be applied.

The foregoing description and example implementation is for the purpose of illustration and description. Modification and variation are possible in light of the above teachings. As noted, the methods are applicable to any data source and other data types not described herein. The methods are also independent of specific computer architecture and can be accomplished on a variety of platforms and may be workstation-based or distributed as through a client-server architecture. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer readable media, such as secondary storage devices, like hard disks, floppy disks, or CD-ROM; a carrier wave from the Internet; or other forms of memory.

Therefore, it is intended that this invention not be limited to the particular embodiment and method disclosed herein, but that the invention include all embodiments falling within the scope of the appended claims.

What is claimed:

1. A method of importing data into a data analysis system, comprising the steps of:
    enabling a user to specify first user defined options for operating on a first data set;
    generating an intermediate representation of the first data set based on said user first defined options;
    enabling a user to specify second user defined options for operating on a second data set;
    generating an intermediate representation of the second data set based on said user second defined options;
    enabling a user to select a basic operation for combining the data sets or to select a non-basic operation for combining the data sets;
    said basic operation being operative to combine said data sets upon user selection of a first graphical interface control, and
    said non-basic operation being operative to combine said data sets based on user selection of at least two graphical interface controls from a group of graphical interface controls; and
    processing said basic or non-basic selected operation to merge said data sets and produce a final data representation to be used for analysis of said data.

2. The method of claim 1 wherein said data sets comprise data of different types.

3. The method of claim 1 wherein said intermediate representation is a data table.

4. The method of claim 3 wherein said user defined options enable a user to select particular rows and columns of the data set for inclusion in the final data representation.

5. The method of claim 1 wherein said final data representation is a data table.

6. The method of claim 1 wherein said first and second user defined options include an option to extract relevant data from the first and second data sets respectively.

7. The method of claim 1 wherein said first and second user defined options include an option to standardize the format of data from the first and second data sets respectively.

8. A method of creating a data set for use in a data analysis system, comprising the steps of:
    enabling a user to access first and second data sets for data analysis;
    enabling the user to select a basic operation for combining the data sets or to select a non-basic operation for combining the data sets,
    said basic operation being operative to combine said data sets upon user selection of a first graphical interface control, and
    said non-basic operation being operative to combine said data sets based on user selection of at least two graphical interface controls from a group of graphical interface controls.

9. The method of claim 8 wherein said basic operation combines said data sets by concatenating said data sets.

10. The method of claim 9 wherein said basic operation may concatenate said data sets in a head-to-tail manner or in a side-by-side manner.

11. The method of claim 8 wherein said non-basic operation is defined by operation on a first characteristic of said data sets and by operation on a second characteristic of said data sets.

12. The method of claim 11 further comprising providing a plurality of first characteristic graphical interface controls for specifying the manner of operation on said first characteristic when said data sets are combined and a plurality of second characteristic graphical interface controls for specifying the manner of operation on said second characteristic when said data sets are combined.

13. The method of claim 12 wherein said data sets are combined to form a data table and said first characteristic corresponds to a row of said data table and said second characteristic corresponds to a column of said data table.

14. The method of claim 13 wherein said first and second graphical interface controls include at least an intersection control to invoke a mathematical intersection operation.

15. The method of claim 13 wherein said first and second graphical interface controls include at least a union control to invoke a mathematical union operation.

16. The method of claim 15 wherein said first and second graphical interface controls include at least a precedence control to signify that data of a selected data set is to be used for the combined data table when values representing corresponding elements are located in both the first and second data sets.

17. The method of claim 8, further comprising the steps of:
    accessing at least one data set to be imported into the data analysis system;
    determining the format of the data set;
    identifying each location of the data set that has a value missing; and
    providing a same indicator for each missing value of each data set to be imported into the system.

18. The method of claim 17 comprising the step of providing multiple options for a user to specify a manner in which to identify a value that is missing from a location of the data set.

19. The method of claim 8, further comprising the steps of:
    accessing at least one data set to be imported into the data analysis system;
    determining the format of the data set;
    identifying each location of the data set that has a value missing; and
    providing an indicator that a value is missing at the identified locations, wherein the same indicator is provided for each missing value of each data set to be imported into the system.

20. The method of claim 19 comprising a step of providing multiple options for a user to specify a manner in which to identify a value that is missing from a location of the data set.

21. A method of creating a data set for use in a data analysis system, comprising the steps of:
    accessing first and second data sets for data analysis;
    enabling a user to select a basic operation for combining the data sets or to select a non-basic operation for combining the data sets,
    said basic operation being operative to combine said data sets upon user selection of a first graphical interface control, said basic operation combining by concatenating said data sets in a head-to-tail manner or in a side-by-side manner, and said non-basic operation being operative to combine said data sets based on user selection of at least two graphical interface controls from a group of graphical interface controls.

22. The method of claim 21 wherein said non-basic operation is defined by operation on a first characteristic of said data sets and by operation on a second characteristic of said data sets.

23. The method of claim 22 wherein said data sets are combined to form a data table and said first characteristic corresponds to a row of said data table and said second characteristic corresponds to a column of said data table.

24. The method of claim 23 further comprising providing a plurality of first characteristic graphical interface controls for specifying the manner of operation on said first characteristic when said data sets are combined and a plurality of second characteristic graphical interface controls for specifying the manner of operation on said second characteristic when said data sets are combined.

25. The method of claim 24 wherein said first and second graphical interface controls include at least an intersection control to invoke a mathematical intersection operation.

26. The method of claim 24 wherein said first and second graphical interface controls include at least a union control to invoke a mathematical union operation.

27. The method of claim 24 wherein said first and second graphical interface controls include at least a precedence control to signify that data of a selected data set is to be used for the combined data table when values representing corresponding elements are located in both the first and second data sets.

28. A method of creating a data set for use in a data analysis system, comprising the steps of:

accessing first and second data sets for data analysis;

enabling a user to select a basic operation for combining the data sets or to select a non-basic operation for combining the data sets, said basic operation being operative to combine said data sets upon user selection of a first graphical interface control, and said non-basic operation being operative to combine said data sets based on user selection of at least two graphical interface controls from a group of graphical interface controls, said non-basic operation being defined by operation on a first characteristic of said data sets and by operation on a second characteristic of said data sets, and wherein said group of graphical interface controls comprise a plurality of first characteristic graphical interface controls for specifying the manner of operation on said first characteristic when said data sets are combined and a plurality of second characteristic graphical interface controls for specifying the manner of operation on said second characteristic when said data sets are combined.

29. The method of claim 28 wherein said data sets are combined to form a data table and said first characteristic corresponds to a row of said data table and said second characteristic corresponds to a column of said data table.

30. The method of claim 29 wherein said first and second graphical interface controls include at least an intersection control to invoke a mathematical intersection operation.

31. The method of claim 29 wherein said first and second graphical interface controls include at least a union control to invoke a mathematical union operation.

32. The method of claim 29 wherein said first and second graphical interface controls include at least a precedence control to signify that data of a selected data set is to be used for the combined data table when values representing corresponding elements are located in both the first and second data sets.

* * * * *

UNITED STATES PATENT AND TRADEMARK OFFICE
CERTIFICATE OF CORRECTION

PATENT NO. : 6,718,336 B1
DATED : April 6, 2004
INVENTOR(S) : Saffer et al.

It is certified that error appears in the above-identified patent and that said Letters Patent is hereby corrected as shown below:

Title page,
Item [75], Inventors, "Calaprist," should read -- Calapristi, --.

Column 16,
Lines 31 and 44, "claim 8, further" should read -- claim 8 further --.

Signed and Sealed this

Twenty-eighth Day of September, 2004

JON W. DUDAS
*Director of the United States Patent and Trademark Office*